(12) United States Patent
Sridharan et al.

(10) Patent No.: US 7,733,777 B1
(45) Date of Patent: Jun. 8, 2010

(54) ADAPTIVE RATE ALLOCATION FOR MULTIPLE TCP SOURCES IN WIRELESS NETWORKS

(75) Inventors: Ashwin Sridharan, San Mateo, CA (US); Majid Ghaderi, Amherst, MA (US); Hui Zang, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 405 days.

(21) Appl. No.: 11/760,370

(22) Filed: Jun. 8, 2007

Related U.S. Application Data

(63) Continuation-in-part of application No. 11/465,206, filed on Aug. 17, 2006.

(51) Int. Cl.
*H04J 1/16* (2006.01)
(52) U.S. Cl. .................. 370/231; 370/395.21
(58) Field of Classification Search . 370/395.1–395.65, 370/229–240
See application file for complete search history.

(56) References Cited

U.S. PATENT DOCUMENTS

| | | | | |
|---|---|---|---|---|
| 2003/0007456 | A1* | 1/2003 | Gupta et al. | 370/232 |
| 2004/0042387 | A1* | 3/2004 | Geile | 370/206 |
| 2005/0271005 | A1* | 12/2005 | Rajkotia | 370/329 |
| 2006/0203731 | A1* | 9/2006 | Tiedemann et al. | 370/235 |
| 2008/0025216 | A1* | 1/2008 | Singh et al. | 370/231 |

OTHER PUBLICATIONS

Majid Ghaderi, et al., "TCP-Aware Channel Allocation in CDMA Networks," A preliminary version of this paper appeared in ACT MobiCom '06, Los Angeles, USA, Sep. 24-29, 2006.

Majid Ghaderi, et al., "TCP-Aware Rate Allocation in Multi-Rate Muti-User CDMA System," A. Sridharan and H. Zang are with Sprint Advanced Technology Labs in California, R. Cruz is with the Department of Electrical and Computer Engineering at the University of California San Diego.

Majid Ghaderi, et al., "Modeling TCP in a Multi-Rate Multi-User CDMA System," This research is continuing through participation in the International Technology Alliance sponsored by the U.S. Army Research Laboratory and the U.K. Ministry of Defence and was accomplished under Agreement No. W911NF-06-3-0001.

Telecommunications Industry Association, "TIA EIA IS-2000," [Online], www.tiaonline.org/standards/sfg/imt2k/cdma2000/, Mar. 2000.

(Continued)

*Primary Examiner*—Chi H Pham
*Assistant Examiner*—Fan Ng

(57) ABSTRACT

A media, method, and system, are provided for dynamically allocating channel resources to multiple TCP sessions in a wireless network. The wireless network may be a multi-rate network having a base station controller that adapts wireless channel rates associated with a communication session based on a preemption probability associated with a high-rate channel. The base station controller includes a scheduler and optimization engine that probes the wireless network to gather TCP parameters, such as round trip times, etc. The optimization engine utilizes a long-term sending rate to generate a subset of channel rates from available channel rates associated with the wireless network. The scheduler engine utilizes the instantaneous sending rate to adapt the wireless channel rate by selecting a channel rate from the subset of channel rates.

11 Claims, 20 Drawing Sheets

OTHER PUBLICATIONS

K. Mattar, et al., "On the Interaction of TCP and the Wireless Channel in CDMA 2000 Networks," Sprint Advanced Technology Labs, Technology Report RR06-ATL-052666, May 2006.
E. Chaponniere, et al., "Effect of physical layer bandwith variation on TCP performance in CDMA2000," in Proc. IEEE VTC Spring, Apr. 2003, pp. 336-342.
C. Casetti, et al., "TCP Westwood: end-to-end congestion control for wired/wireless networks," ACM Wireless Networks, vol. 8, No. 5, pp. 467-479, 2002.
T. Goff, et al., "Freeze-TCP: A true end-to-end TCP enhancement mechanism for mobile environments," in Proc. IEEE INFOCOM, Tel Aviv, Israel, 2000, pp. 1537-1545.
R. Ludwig, et al. "The Eifel algorith: Making TCP robust against spurious retransmissions," ACM SIGCOMM Comput. Commun. Rev., vol. 30, No. 1, pp. 30-36, 2000.
H. Balakrishnan, et al., "Improving reliable transport and handoff performance in cellular wireless networks," ACM Wireless Networks, vol. 1, No. 4, pp. 469-481, 1995.
M.C. Chan, et al., "TCP/IP performance over 3G wireless links with rate and delay variation," in Proc. ACM MOBICOM, 2002 pp. 71-82.
"Improving TCP/IP performance over third generation wireless networks," in Proc. IEEE INFOCOM, Hong Kong, 2004.
C. Barakat, et al., "On TCP performance in a heterogenous network: A survey," IEEE Communications Magazine, pp. 40-46, Jan. 2000.
H. Elaarag, "Improving TCP performance over mobile networks," ACM Comput. Surv., vol. 34, No. 3, pp. 357-374, 2002.
C. Barakat, et al., "Bandwith tradeoff between TCP and link-level FEC," Computer Networks, vol. 39, No. 5, pp. 133-150, 2002.
B. Liu et al. "TCP-cognizant adaptive forward error correction in wireless networks," in Proc. IEEE Globecom, Taipei, Taiwan, Nov. 2002.
D. Barman, et al., "TCP optimization through FEC, ARQ and transmission power trade offs," in Proc. WWIC, Frankfurt, Germany, Feb. 2004.
F. Baccelli, et al., "CDMA channel parameters maximizing TCP throughput," in Proc. Workshop on Information Theory and its Applications, La Jolla, USA, Feb. 2006.
A. Chockalingam, et al., "Crosslayer design for optimizing TCP performance," in Proc. IEEE ICC, Seoul, Korea, May 2005.
M. Zorzi, "Throughput analysis of TCP on channels with memory," IEEE J. Select. Areas Commun., vol. 18, No. 7, pp. 1289-1300, 2000.

A. Chockalingam, et al., "Performance of TCP/RLP protocol stack on correlated rayleigh fading DS-CDMA links," IEEE Trans. Veh. Technol., vol. 49, No. 1, pp. 28-33, 2000.
K.L. Gray, et al., "The effect of adaptive-rate coding on TCP performance in wireless communications," in Proc. EUROCOMM, 2000.
T. Klein et al. "Improved TCP performance in wireless IP networks through enhanced opportunistic scheduling algorithms," in Proc. IEEE Globecom, vol. 5, 2004, pp. 2744-2748.
E. Altman, et al., "Analysis of AIMD protocols over paths with variable delay," in Proc. IEEE INFOCOM, Hong Kong, Mar. 2004.
J.P. Singh, et al., "Channel state awareness based transmission power adaptation for efficient TCP dynamics in wireless networks," in Proc. IEEE ICC, Seoul, Korea, May 2005.
V. Misra, et al., "Fluid-based analysis of a network of AQM routers supporting TCP flows with an application to RED," in Proc. ACM SIGCOMM, Stockholm, Sweden, Aug. 2000, pp. 151-160.
M. Ghaderi, et al., "TCP aware resource allocation in CDMA networks," in Proc. ACM MOBICOM, Los Angeles, USA, Sep. 2006, pp. 215-226.
K. Mattar, et al., "Performance evaluation of TCP in CDMA 2000 networks," Sprint Advanced Technology Labs, Technical Report RR06-ATL-030567, Mar. 2006.
F. Baccelli, et al., "TCP throughput analysis under transmission error and congestion losses," in Proc. IEEE INFOCOM, Hong Kong, Mar. 2004.
F. Baccelli, et. al., "Analysis of the competition between wired, DSL and wireless TCP flows in an access network," in Proc. IEEE INFOCOM, Miami, USA, Mar. 2005.
F.J. McWilliams, et al., The Theory of Error-Correcting Codes. New York, USA: North-Holland, 1977.
E. Altman, "Capacity of a Multi-Service Cellular Network with Transmission Rate Control: A Queueing Analysis," In Proc. ACM MOBICOM, Atlanta, USA, Sep. 2002.
F. Baccelli, et al., Mellin Transforms for TCP Throughput with Applications to Cross Layer Optimization, in Proc. CISS, Princeton, USA, Mar. 2006.
G. Fodor, et al., On the Tradeoff Between Blocking and Dropping Probabilities in CDMA Networks Supporting Elastic Services, in Proc. IFIP/Networking, Coimbra, Portugal, May 2006.
M. Ghaderi, et al., Performance Modelling of TCP in a Multi-Rate Multi-User CDMA System, Technical report, RR06-ATL120729, Sprint ATL (2006).

* cited by examiner

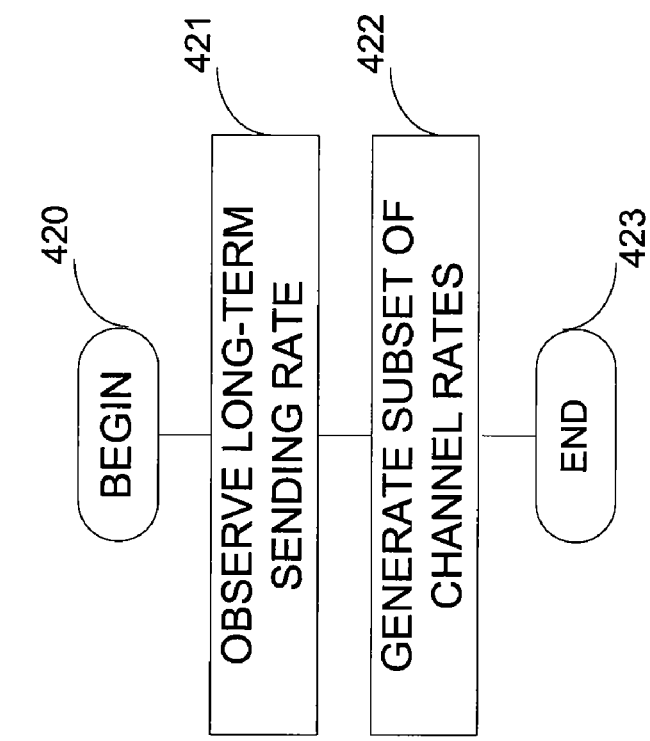
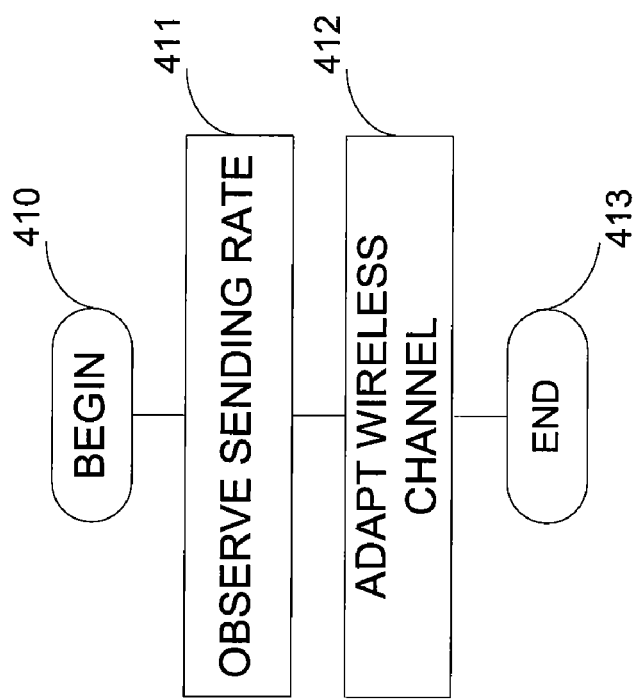
FIG. 4B
FIG. 4A

US 7,733,777 B1

ADAPTIVE RATE ALLOCATION FOR MULTIPLE TCP SOURCES IN WIRELESS NETWORKS

CROSS-REFERENCE TO RELATED APPLICATIONS

This application is a continuation-in-part of application Ser. No. 11/465,206 filed Aug. 17, 2006.

STATEMENT REGARDING FEDERALLY SPONSORED RESEARCH OR DEVELOPMENT

Not applicable.

BACKGROUND

Conventionally, first generation wireless communication networks were configured to operate at one specified channel rate. Schedulers were not required in the first generation wireless communication networks because only one channel rate was available. Advances in wireless communication technology has introduced third generation wireless communication networks, such as W-CDMA, CDMA 2000 1xRTT and 1xEV-DO, that provide multiple rates and scheduling policies for dynamically transitioning between the multiple rates.

Typically, the scheduling policies for the third generation wireless communication networks select a high channel rate to quickly clear buffer backlogs. Essentially, this policy attempts to optimize output to a user by always utilizing the fastest available channel rate. This type of scheduling policy may be ideal for inelastic applications, such as VOIP, that provide a constant sending rate. For inelastic applications, the high channel rate may be configured to the constant sending rate, so, the channel rate matches the constant sending rate. However, when elastic applications, such as TCP, provide variable sending rates, a scheduling policy that always assigns the highest channel data rate introduces channel rate inefficiencies. For instance, if a TCP sending rate varies between 2 kbps-5 kbps and the scheduling policy assigns a channel rate of 5 kbps there is waste in power and channel bandwidth when the TCP sending rate is 2 kbps. The difference between the channel rate and the TCP sending rate, 3 kbps, is not effectively utilized until the TCP sending rate increases to 5 kbps. In other words, a scheduling policy that always aims to clear buffer backlog can be sub-optimal for TCP because the TCP sender may not effectively utilize the high channel rate. Additionally, the high channel rate may introduce more data errors than a low channel rate.

Modern CDMA wireless channels support multiple transmission rates, which can be dynamically assigned to users based on traffic demand. However, in practice, assignment of high rate channels comes with the penalty of increased power as well as smaller orthogonal codes, which constrains their assignment to only a subset of active users. This motivates the need to carefully control high rate channel assignments so as to minimize power and achieve fairness among users.

SUMMARY

The present invention is defined by the claims below. Embodiments of the present invention solve at least the above problems by providing a media, system and method for, among other things, dynamically allocating channel resources to TCP sessions. In this work, we propose a simple class of channel allocation policies to achieve this goal for TCP sessions. We develop an analytical model that explicitly captures both TCP dynamics and the impact of multiple users contending for a shared resource to evaluate the performance of the allocation policy.

In a first aspect, computer-readable media having computer-useable instructions embodied thereon for performing a method to allocate wireless channels to TCP sessions in a multi-rate wireless system is provided that includes assigning a fundamental channel to each TCP session in a set of TCP sessions associated with mobile sessions. A TCP transmission rate is less than or equal to a fundamental transmission rate. When the TCP transmission rate reaches the fundamental channel rate for a TCP session, a supplementary channel is requested for the TCP session. The supplementary channel has a supplementary channel rate equal to or greater than the fundamental channel rate. If the supplementary channel is available, the supplementary channel is assigned to the TCP session in place of the fundamental channel. If the supplementary channel is not available, an active TCP session that is already connected to the supplementary channel is preempted based on a preemption policy.

In a second aspect, a wireless system for adaptive scheduling of channel resources is provided that includes mobile devices operating in a wireless network that respectively generate TCP sessions. A base station is communicatively connected to the mobile devices and the wireless network. A wireless channel scheduler generates messages that inform the base station of fundamental channel rates to apply respectively to the TCP sessions, that inform the base station of supplementary channel rates to apply respectively to the TCP sessions when requests are made for a high rate channel, or that inform the base station to preempt the TCP sessions that are respectively connected to the supplementary channels with a preemption probability.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4A is a logic diagram illustrating a method to adapt wireless channels, according to an embodiment of the present invention;

FIG. 4B is a logic diagram illustrating a method to generate a subset of wireless channels that maximize throughput, according to an embodiment of the present invention;

DETAILED DESCRIPTION

Figure 1:
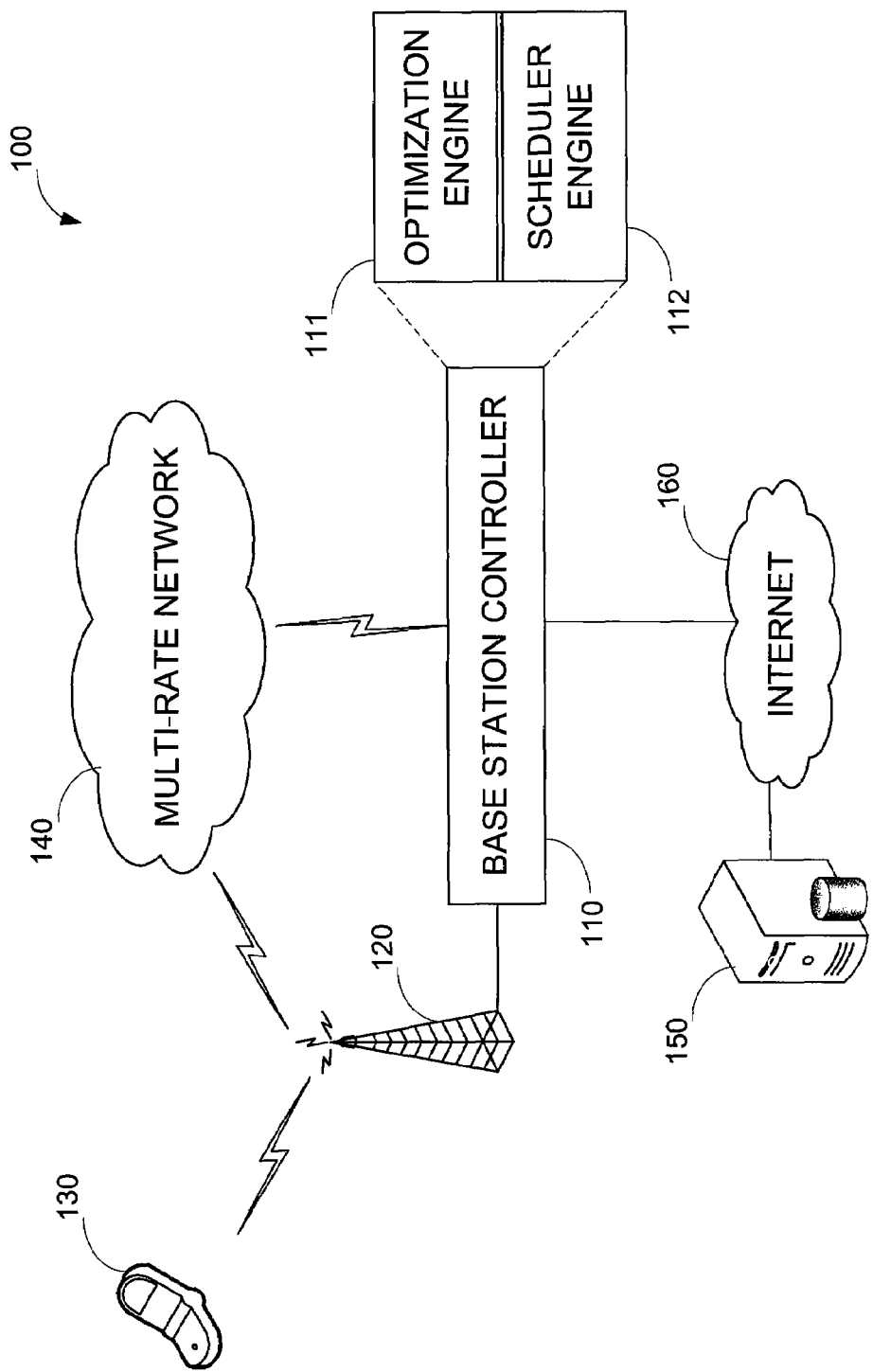
FIG. 1 is a network diagram illustrating an exemplary wireless operating environment, according to an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention provide systems and methods for a multi-rate scheduler that assigns a channel rate in response to a TCP sending rate. The systems and methods also include an optimization engine that generates a subset of available channel rates that may be assigned to maximize TCP throughput. The optimization engine provides cross-layer optimization by utilizing layer-3 information, such as window size or sending rates, to effectively select channel rates for a layer-1 wireless channel. In another embodiment of the invention, an analytical model is provided to compute TCP throughput and to illustrate the effectiveness of the multi-rate scheduler and optimization engine. Accordingly, the optimization engine may generate a set of channel rates that the multi-rate scheduler processes and assigns to a communication session based on the TCP sending rate.

In yet another embodiment, the presence of multiple users is included along with practical constraints on assignment of high rate wireless channels. A class of allocation policies is created for sharing the high rate data channels among concurrent TCP sessions, whose performance is explored both analytically and through simulations. The utility of the model is demonstrated by evaluating the impact of various design features like the number of high rate channels and their data rates on TCP throughput.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BEP | Bit Error Probability |
| BSC | Base Station Controller |
| CDMA | Code Division Multiple Access |
| FER | Frame Error Rate |
| PEP | Packet Error Probability |
| RLP | Radio Link Protocol |
| RTT | Round Trip Time |
| SINR | Signal to Inference and Noise Ratio |
| TCP | Transmission Control Protocol |

As utilized herein, a component refers to any combination of hardware and software. Moreover, computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media may include computer-storage media or communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), magnetic cassettes, magnetic tape, magnetic disk storage, and other magnetic storage devices. These memory components can store data momentarily, temporarily, or permanently.

Communications media typically store computer-useable instructions—including data structures and program modules. Communications media include any information delivery media. By way of example but not limitation, communications media include wired media, such as a wired network or direct-wired connection, Combinations of the above are included within the scope of computer-readable media.

In an embodiment, a wireless operating environment may utilize a multi-rate scheduler and optimization engine to maximize TCP throughput. The wireless operating environment may include multi-rate networks that provide access among client and server devices through wired or wireless communications. FIG. 1 is a network diagram illustrating an exemplary wireless operating environment, according to an embodiment of the present invention. One of ordinary skill in the art appreciates that wireless operating environment 100 has been simplified to illustrate key features of embodiments of the present invention.

In FIG. 1, the wireless operating environment 100 includes a base station controller 110, an antenna 120, a client device 130, a multi-rate network 140, a server device 150 and the Internet 160. The multi-rate network 140 interconnects the antenna 120, the base station controller 110 and the client device 130. The Internet 160 enables the base station controller 110 to communicate with the server device 150. In an embodiment of the present invention, the multi-rate network 140 may include CDMA 2000 1xRTT, CDMA 1xEV-DO, or W-CDMA networks. The multi-rate network 140 can switch between a several channel rates. For instance, the multi-rate network may switch between a high rate of 2.4 mbps and a low rate of 34 kbps. In certain embodiments, a selection of control parameters alter the channel rate of the multi-rate network. The control parameters may include, by way of example and not limitation, coding rate, spreading factor, modulation scheme, link layer retransmission rate and bit error rate.

In certain embodiments, the base station controller (BSC) 110 facilitates mobile communication sessions between the client device 130 and server device 150. The mobile device 130 may also utilize the BSC 110 to communicate with other mobile device (not shown). Additionally, the BSC 110 may include an optimization engine 111 and scheduler engine 112. The optimization engine 111 generates a subset of the available channel rates provided by the multi-rate network 140 that maximizes TCP throughput for the mobile communication session. The scheduler engine 112 selects one or more channel rates from the subset of the available channel rates based on a TCP sending rate associated with the sending device 130 or 150.

The antenna 120 may be communicatively connected to the BSC 110 to enable communication between the client device 130 and multi-rate network 140. The antenna 120 receives and sends wireless signals associated with communication sessions managed by the BSC 110.

The server device 150 may include a database, web server or file server or any other server device that provides file transfer or query services in response to a request. The server device is communicatively connected to the Internet 160, which provides access to the BSC 110. The server device may establish a communication session with the client device 130 via the BSC 110. The server device 150 may include a wired communication interface that connects the server device 150 to the Internet 160. In another embodiment, the server device 150 may include a wireless communication interface.

The client device 130 may include a mobile phone, personal digital assistant or any other mobile communication device. The client device 130 is communicatively connected to the multi-rate network 140 and may establish a communication session with the server device 150. The client device 130 may include a wireless communication interface that connects the client device 130 to the multi-rate network 140. In an embodiment, the client device 130 may be configured to operate as client or server.

Accordingly, in some embodiments of the invention the BSC 110 allocates wireless channel rates based on the TCP sending rate. The optimization engine 111 and scheduler 112 may be implemented in a single component or may be distributed between separate components in the BSC 110 or among other devices in the multi-rate network 140.

The foregoing wireless operating environment 100 is illustrative. Furthermore, the skilled artisan understands that embodiments of the present invention may be implemented in many other operating environments.

In an embodiment of the invention a network probe is utilized to sense or estimate TCP sending rate information. The TCP sending rate is collected for a specified period of time to calculate a long-term TCP-sending rate. The optimization engine utilizes the long-term TCP sending rate information to generate a subset of the channel rates from available channel rates associated with the multi-rate network. Alternatively, the optimization engine observes propagation delays and advertised window sizes to compute TCP throughput and to optimize the subset of available wireless channel rates.

Figure 2:
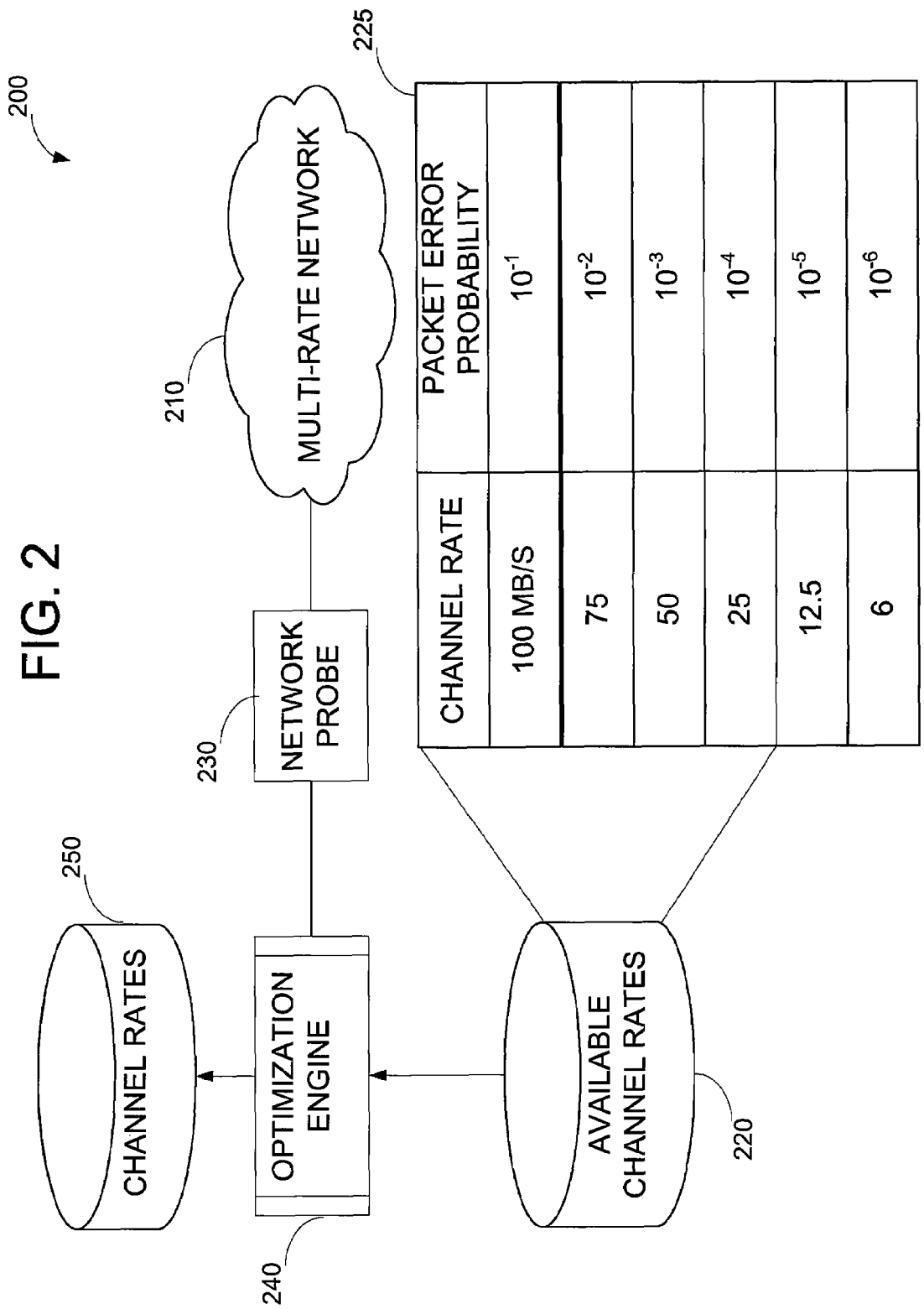
FIG. 2 is a block diagram illustrating an optimization engine, according to an embodiment of the present invention.

FIG. 2 is a block diagram illustrating an optimization engine 240, according to an embodiment of the present invention. A multi-rate network 210 provides a plurality of available channel rates 220 having an associated packet error probability (PEP). The channel rates and PEP are directly related because as the channel rate increase the PEP increases. For instance, in table 225, when the channel rate increases from 25 mbps to 50 mbps, the PEP also increases from $10^{-4}$ to $10^{-3}$. In an embodiment of the present invention, the optimization engine 240 utilizes a network probe 230 to sense a TCP sending rate associated with a sending device connected to the multi-rate network 210. In an alternate embodiment, the network probe 230 may be utilized to collect network information that is utilized to estimate the TCP sending rate. The TCP sending rate information is collected over a period of time and the optimization engine 240 calculates a long-term TCP sending rate and utilizes the long-term TCP sending rate to generate a subset of channel rates that maximize TCP throughput. For instance, the long-term TCP-rate may be average rate over the specified time period ignoring a slow start time period. In an alternate embodiment, window sizes and propagation delays observed over the specified period of time are utilized to compute the long-term TCP sending rate. In turn, the long-term TCP sending rate is utilized by the optimization engine to generate a subset of channel rates 250 from the available channel rates 220 associated with the multi-rate network 210.

Accordingly, the optimization engine 240 provides a selection of channel rates 250 that optimizes TCP throughput. The selection of the channel rate 250 is generated from available channel rates 220 associated with the multi-rate network 210.

In another embodiment, the scheduler engine utilizes a subset of channel rates generated by an optimization engine. The scheduler engine may provide a network probe that observes the instantaneous TCP sending rate. In turn, the channel rate selected by the scheduler engine is chosen from the subset of channel rates based on the instantaneous TCP sending rate.

Figure 3:
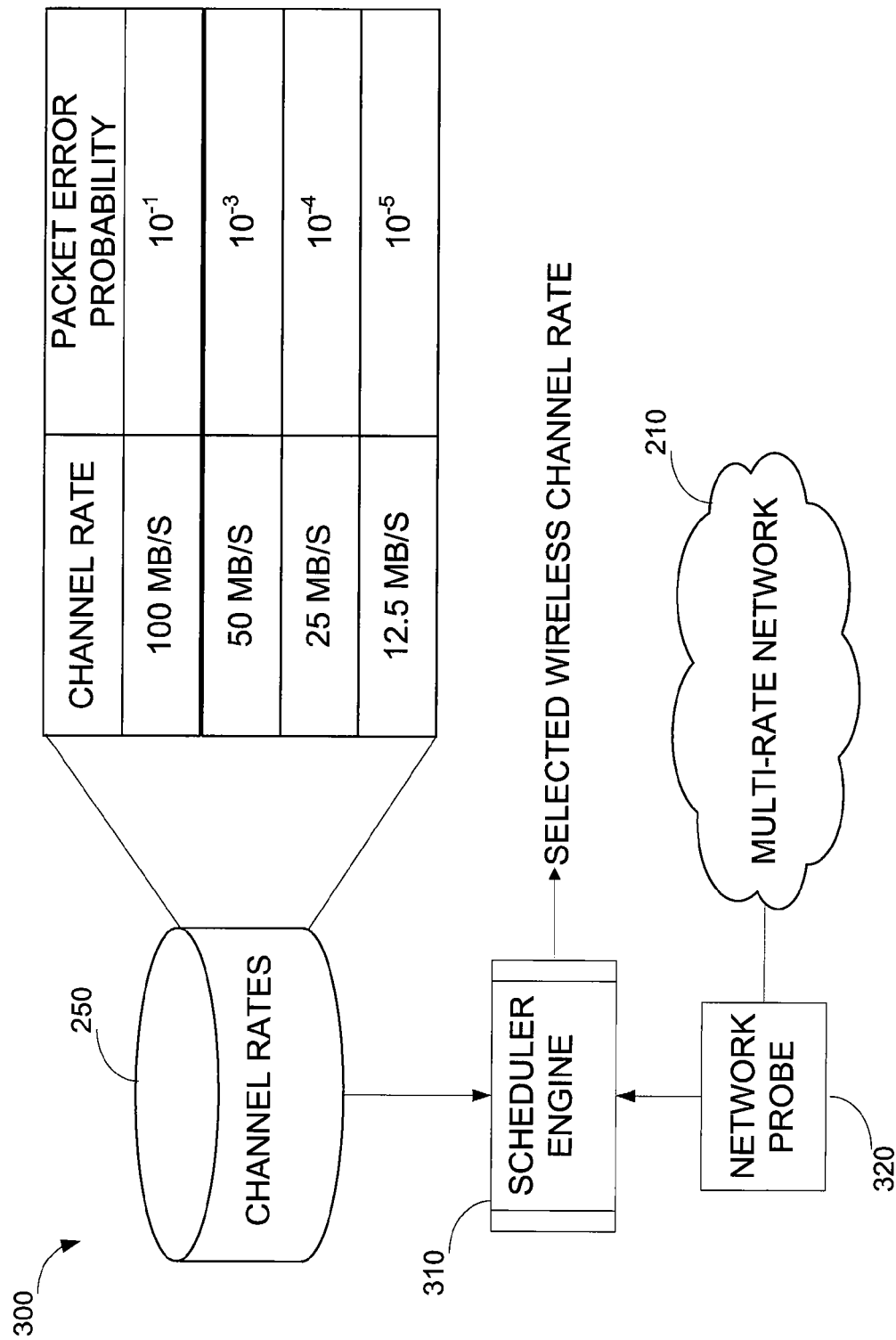
FIG. 3 is a block diagram illustrating a scheduler engine, according to an embodiment of the present invention.

FIG. 3 is a block diagram illustrating a scheduler engine 310, according to an embodiment of the present invention.

The multi-rate network 210 provides access to an instantaneous TCP sending rate associated with a sender device. In an embodiment, the instantaneous TCP sending rate is sensed or estimated by a network probe 320. Based on the observed instantaneous TCP sending rate, the scheduler engine 310 assigns a wireless channel rate from the subset of available channel rates 250. The subset of available channel rates 255 that maximize TCP throughput is processed by the scheduler engine 310 to select the appropriate channel rate.

Accordingly, the channel rate selected from the subset of available channel rates 250 optimizes the TCP throughput for the observed TCP sending rate. As the sending rate varies, the scheduler engine 310 transitions to a new channel rate that continues to maximize the TCP throughput.

In an embodiment of the present invention, a BSC may execute computer-readable instruction for dynamically allocating wireless resources based on an instantaneous TCP sending rate. Additionally, in another embodiment of the present invention, channel rates that optimize throughput for a communication session are generated and utilized by the BSC when allocating resources based on the instantaneous TCP sending rate.

FIG. 4 includes a first logic diagram illustrating a method to adapt wireless channels, according to an embodiment of the present invention as depicted in FIG. 4A, and a second logic diagram illustrating a method to generate a subset of wireless channels that maximizes throughput, according to an embodiment of the present invention as depicted in FIG. 4B.

In FIG. 4A, the method is initiated, at 410, when a communication session is triggered. The BSC observes sending rates associated with a sending device at 411. At 412, the BSC adapts the allocated wireless channel rates based on a variance observed in the sending rates. The method terminates at 413.

In FIG. 4B, the method is imitated, at 420, when the BSC is initialized and a communication session was previously initiated. The BSC observes the long-term sending rate associated with the sending device at step 421. In certain embodiments, the long-term sending rate is calculated from propagation delays and window sizes collected over a period of time. In turn, a subset of available channel rates that maximize throughput is generated based on the long-term sending rate at step 422. The method terminates at 423.

In some embodiments, a BSC may execute instructions that dynamically allocates wireless channel rates in a multi-rate network. When the observed sending rates are variable, the BSC may be utilized to select an appropriate wireless channel rate that maximizes throughput. In an embodiment of the present invention, the sending rates include TCP sending rates and the throughput is TCP throughput.

In another embodiment of the present invention, an analytical framework is provided to enable selection of channel rates that maximize throughput. The analytical framework utilizes a variable sending rate and considers operating environments where the sending rate is not constrained and other operating environments where the sending rate is constrained. The unconstrained operating environment provides a window size that is allowed to grow large enough so that a communication session experiences both channel and congestion losses. The constrained operating environment provides a sender window size that is constrained by the receiver advertised window size, which prevents the communication session from experiencing congestion related loss. In a constrained operating environment, the communication session experiences only channel related loss.

Figure 5:
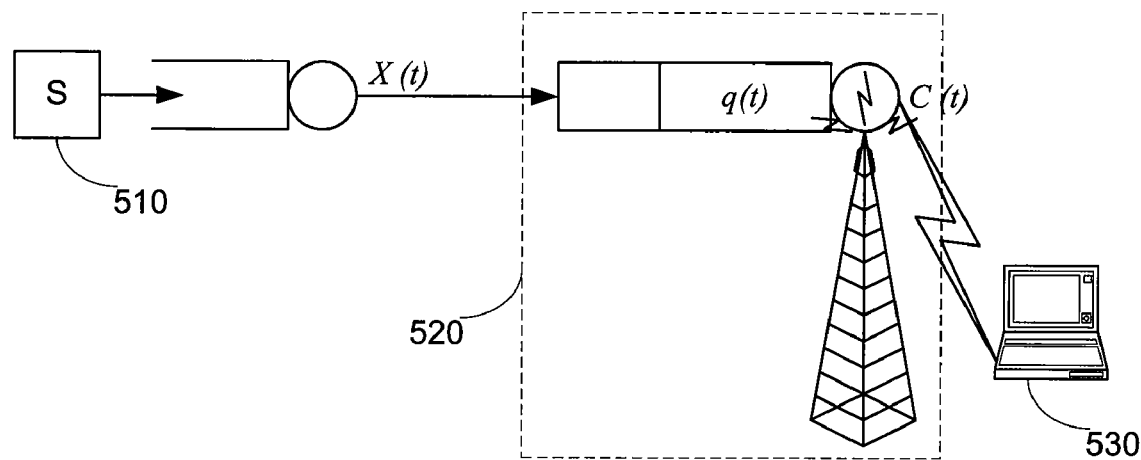
FIG. 5 is a simplified network diagram illustrating an analytical framework associated with a wireless hop in a network, according to an embodiment of the present invention.

FIG. 5 is a simplified network diagram illustrating an analytical framework associated with a wireless hop in a network, according to an embodiment of the present invention. The network include a sender device 510, a base station 520 executing a multi-rate scheduler, and a receiver device 530. The sender devices 510 sends data at a rate of X(t) and the base station 520 communicates with the receiver device 530 over a wireless channel at a downlink transfer rate C(t). Here, the analytical framework considers a bulk TCP transfer over the wireless channel to the receiver device 530.

When a TCP sending rate X(t) exceeds the current channel rate C(t), the base station increases the channel rate C(t). If the sending rate X(t) exceeds the maximum possible channel rate C(t), the session experiences packet loss due to dropped packets. Alternatively, when the TCP sending rate X(t) is below the current channel rate C(t), the base station decreases the channel rate C(t). For exemplary purposes, a multi-rate scheduler that switches between at least two rates is considered in the following discussion. One of ordinary skill in the art appreciates and understands that similar procedures may utilized for multi-rate networks having more than two rates.

$$C(t) = \begin{cases} C_0 \\ C_1 \end{cases}$$

The base station controller determines which of two channel rates $C_0$ or $C_1$, where $C_0 \leq C_1$, are to be assigned based upon the current TCP sending rate X(t). If the TCP sending rate X(t) is below $C_0$, the base station assigns a channel rate of $C_0$, else it assigns $C_1$. Thus, if X(t) exceeds a fundamental channel threshold, $C_0$, the base station dynamically increases the channel rate C(t) rate to a higher channel rate by assigning a supplemental channel. In an embodiment, the supplemental channel is achieved by reducing the Walsh code length, which reduces the spreading factor thus increasing channel rate C(t). For instance, in CDMA 2000 1xRTT, a fundamental channel has a channel rate, C(t),of 2.3-9.6 kbps in comparison with a supplemental channel rate, C(t), of 19.2-135 kbps.

In another embodiment of the present invention, a packet error probability (PEP) is a function of the assigned channel rate, C(t), and denoted by $p_0(p_1)$ when the assigned channel rate is $C_0$ or $C_1$, respectively. Typically, an increase in channel rate comes at the cost of increased PEP. However, this does not have to be the case when signal power is significantly increased. In some embodiments $p_0 \leq p$ because $C_0 \leq C_1$. Thus, $(p_i, C_i)$ together may define a state or mode associated with the base station controller. One of ordinary skill in the art appreciates and understands that the analytical framework may be modified by estimating or receiving information about timeout values, window size, sending state etc. may enable the multi-rate scheduler executed by the base station to make better decisions. In some embodiments, the analytical framework focuses on the sending rate.

Figure 6:
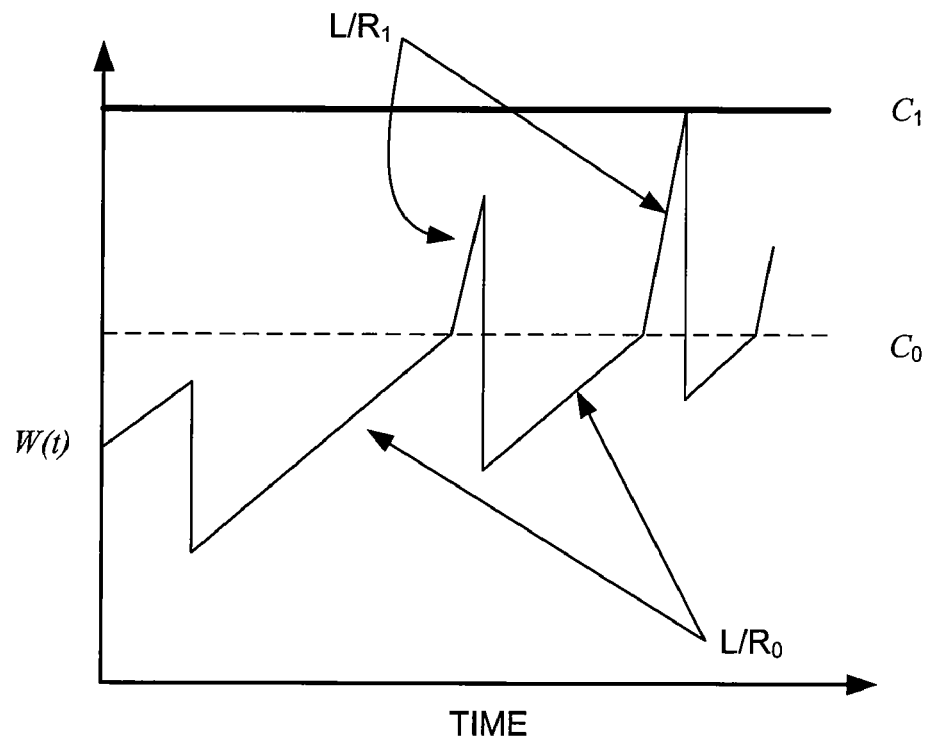
FIG. 6 is a graph diagram illustrating an evolution of a window size at a sending device over a time period, according to an embodiment of the present invention.

In the analytical framework for the multi-rate wireless system, round trip time (RTT) is related to the TCP sending rate X(t) because channel capacity C(t) directly affects the value of the RTT for a communication session. RTT and PEP are functions of X(t) because C(t) is affected by X(t). Moreover, the window size W(t)grows at rates dependent on the C(t). FIG. 6 is a graph diagram illustrating an evolution of a window size at a sending device over a time period, according to an embodiment of the present invention. The graph illustrates a growth rate of W(t) as C(t) changes.

In an embodiment of the present invention, W(t) is the window size at the sender device at time t and R(t) is round trip time at time t. The base station may be in mode i=zero or one at time t. The round trip time $R(t)=R_i=a+L/C_i$ where a is the propagation delay, L is packet length and "$C_i$" is channel rate in mode i.

The instantaneous sending rate X(t) is the TCP sending rate at time t and may expressed as function of the R(t). In other words, $$X(t) = \frac{W(t)}{R(t)}.$$

As indicated in FIG. 6 when there is no packet loss, the window size W(t) increase at a rate of $L/R_i$. Accordingly, when there is no loss due to congestion or channel related loss, the sending rate X(t) grows at a rate $$\frac{L}{R_i^2}.$$

The expression below illustrates this after substituting the appropriate expression for X(t) and denoting that the window size grows by L bits or one packet every $R_i$ seconds.

$$\frac{X(t+R_i) - X(t)}{R_i} = \frac{W(t+R_i) - W(t)}{R_i^2} = \frac{L}{R_i^2}.$$

The channel related losses are a function of $p_i$, PEP, and may be modeled by an inhomogeneous Poisson process with rate $p_i X(t)$, where i=zero or one at time t.

When the sending device is unconstrained, the probability of experiencing TCP congestion is one. However, when the sending device is constrained to the receiver window size, X(t) stops when it reaches the maximum advertised window size and the losses are only channel losses. The analytical framework deals with instances when X(t) is unconstrained and constrained while operating with $C_1 \leq 2C_0$ for channel rates.

The density function of X(t) at time t in mode i with C(t) being the channel rate at time t is defined as:

$$f_i(x,t)dx = P\{x \leq X(t) \leq x+dx, C(t)=C_i\}.$$

From the above expression the following is derived for the density function:

$$f(x,t) = f_0(x,t) + f_1(x,t).$$

The analytical framework defines the following terms for the rate of change or acceleration associated with X(t), and the current PEP:

$$\delta_i = \frac{L}{R_i^2}, \quad i=0, 1, \text{ and,}$$

$$\gamma_i = \frac{p_i}{L}, \quad i=0, 1.$$

The transition points between $C_0$ and $C_1$ provide a unique jump characteristic associated with multiple-rate wireless systems. Let at some time t−, the TCP sending rate increases to $X(t-)=C_0$. The corresponding window size is given by $W(t-)=C_0 R_0$. As per the base station's scheduling policy, the base station assigns a rate of $C_1$ to the communication session at time t+ resulting in a new RTT of $R_1$. Because TCP is a window-based protocol, the window size is continuous at the rate transition point. Specifically, $W(t+)=W(t-)=C_0 R_0$. Consequently, the new sending rate would be given by:

$$X(t^+) = \frac{W(t^+)}{R_1} = \frac{R_0 \cdot C_0}{R_1} = \frac{R_0}{R_1} C_0 = \frac{R_0}{R_1} X(t^-).$$

Figure 7:
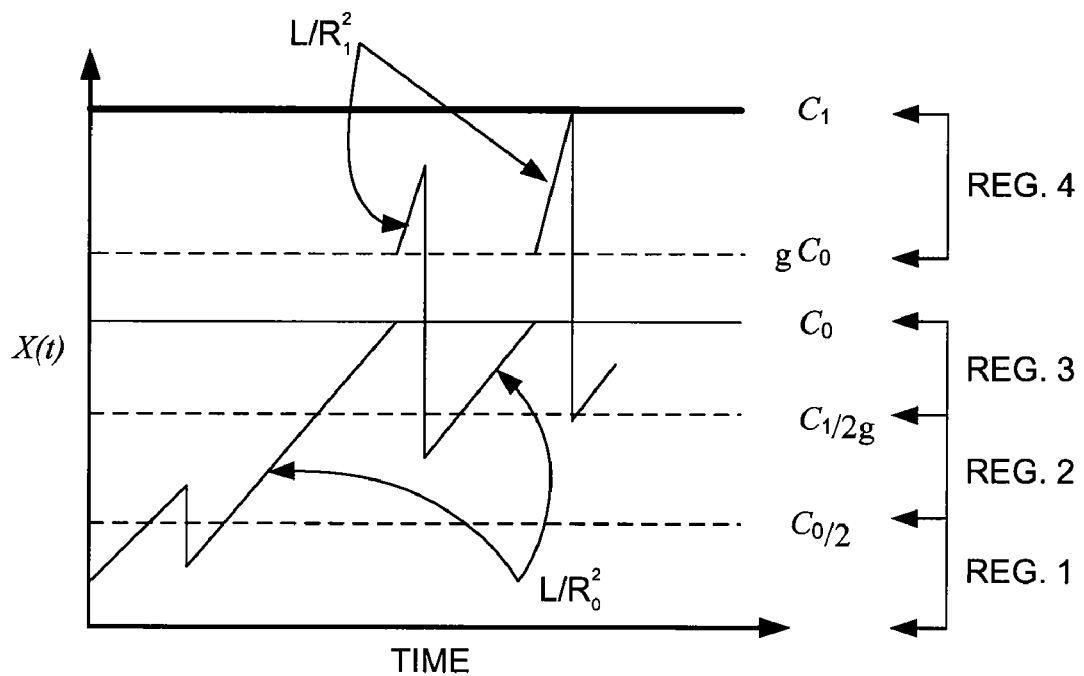
FIG. 7 is a graph diagram illustrating an evolution of a sending rate associated with the sending device over the time period, according to an embodiment of the present invention.

In other words, the TCP sending rate X(t) experiences a discontinuous jump by a factor of $g=R_0/R_1$ when the channel capacity transitions from $C_0$ to $C_1$. Similar calculations can be used to show that if $X(t) \geq C_0$ and TCP experiences a loss, the sending rate X(t) drops by a jump factor ½g. This aspect of the TCP sending rate X(t) must be accounted for in the analytical framework. FIG. 7 is a graph diagram illustrating an evolution of a sending rate associated with the sending device over the time period, according to an embodiment of the present invention. In a rate unconstrained wireless system, for $C_0 \leq C_1 \leq 2C_0$, sending rate X(t) is segmented into four different regions "REG. 1" for $0-C_0/2$, "REG. 2" for $C_0/2-C_1/2g$, "REG. 3" for $C_1/2g-C_0$ and "REG. 4" for $gC_0-C_1$ as shown by dotted lines in FIG. 7. The discontinuity in X(t) when the sending rate transitions from $C_0$ to $C_1$ is clearly visible in the figure at $C_0$. Because of the illustrated discontinuity between $C_0$ and $gC_0$, the growth path for X(t) never resides in the region between $C_0$ and $gC_0$, in contrast with the growth rate of the window size W(t) illustrated in FIG. 6, where W(t) is continuous over all regions. Below the analytic framework focuses on a two-rate wireless system for ease of discussion and not limitation. One of ordinary skill in the art can readily adapt this analytical framework to a larger number of rates. In each of the four regions, forward difference equations for the probability density function $f_i(x, t)$ of the TCP sending rate by evaluating the probability of a certain event at time t+Δt as a function of the events at time t. Additionally, forward difference equations are utilized to analyze the boundary conditions $$X(t) = \frac{C_0}{2}, \quad X(t) = \frac{C_1}{2g}$$

and $X(t)=C_0$.

For boundary condition $$X(t) = \frac{C_0}{2},$$

the forward difference equation is:

$$f_{t+\Delta t, 0}(C_0/2)\frac{\Delta t}{R_0^2} =$$

$$f_{t,0}(C_0/2 - \delta_0 \Delta t)\frac{\Delta t}{R_0^2}(1-\gamma_0 C_1/2\Delta t) + f_{t,0}(2C_0)\frac{2\Delta t}{R_0^2}(\gamma_0 C_0 \Delta t)$$

Applying the limit of t approaching infinity and $\Delta t$ approaching zero, the following condition is obtained:

$$f_0((C_0/2)^+(=f_0)(C_0/2))^-)$$

For boundary condition $$X(t) = \frac{C_1}{2g}$$

the forward difference equation is:

$$f_{t+\Delta t,0}(C_1/2g)\frac{L\Delta t}{R_0^2} = f_{t,0}(C_1/2g - \delta_0\Delta t)\frac{L\Delta t}{R_0^2}(1 - \gamma_0 C_1/2g \cdot \Delta t) +$$

$$f_{t,1}(C_1 - \delta_1\Delta t)\frac{L\Delta t}{R_1^2}(1 - \gamma_1 C_1 \Delta t)$$

Applying the limit of t approaching infinity and $\Delta t$ approaching zero, the following condition is obtained:

$$\frac{1}{R_0^2} \cdot f_0((C_1/2g)^+) = \frac{1}{R_0^2} \cdot f_0((C_1/2g)^-) + \frac{1}{R_1^2} f_1(C_1^-)$$

This expression comes about because the probability that at time $t+\Delta t$, the sending rate $X(t+\Delta t)$ is $C_1/2g$ is equal to the probability that at time t, the sending rate $X(t)$ was in the neighborhood of $C_1/2g$ and there was no loss or the rate was in the neighborhood of $C1/2g$ and again there was no loss, in which case the rate would hit $C_1$ and instantaneously drop down to $C1/2g$. This relationship illustrates the impact of different growth rates $$\frac{1}{R_0^2}$$

and $$\frac{1}{R_1^2}$$

and effectively limits the growth rate at time t to at most $$\frac{L\Delta t}{R_i^2}$$

in mode i.

Applying the forward difference equation in a similar manner the boundary condition $X(t)=C_0$:

$$\frac{1}{R_1^2} \cdot f_1((gC_0)^+) = \frac{1}{R_0^2} \cdot f_0((C_0)^-)$$

For the first region $0<X(t)<C_0/2$, at time, $t+\Delta t$, the sending rate $X(t+\Delta t)$ attains a value, x. Only one of two possible events could have occurred at time t. One, at time t the TCP sending rate $X(t)$ was $$x - \frac{L}{R_0^2}\Delta t$$

and it experiences no loss during the interval $(t+\Delta t)$. Thus, the TCP sending rate $X(t)$ at time t grows by an amount $$\frac{L}{R_0^2}\Delta t = \delta_0 \Delta t$$

during the interval $(t+\Delta t)$. Alternatively, at time t, $X(t)=2x$ and the sender experiences a loss event, resulting in change in sending rate $X(t)$ to $2x/2=x$. Combining these two disjoint events yields the following forward difference equation:

$$f_0(x,t+\Delta t) = f_0(x-\delta_0\Delta t,t)(1-\gamma_0 x\Delta t) + f_0(2x,t)4\gamma_0 x\Delta t,$$

$$f_1(x,t+\Delta t)=0$$

With some rearrangement the analytical framework obtains:

$$f_0(x,t+\Delta t) - f_0(x-\delta_0\Delta t,t) = -\gamma_0 x\Delta t f_0(x-\delta_0\Delta t,t) + f_0(2x,t) 4\gamma_0 x\Delta t,$$

$$f_1(x,t+\Delta t)=0$$

Letting $\Delta t$ approach 0, the analytical framework obtain a set of partial differential equations for $f_i(x,t)$. When $X(t)$ has a steady state distribution from time t to infinity, the analytical framework obtains the following differential equation for the distribution of $f_i(x)$, where $$\dot{f}_i(x) \text{ is } \frac{df_i(x)}{dx}:$$

$$\delta_0 f_0(x) = -\gamma_0 x f_0(x) + 4\gamma_0 x f_0(2x),$$

$$f_1(x)=0$$

The noted expression may be solved by the Mellin Transforms, where $\tilde{f}(u)$, $u \geq 1$ is the Mellin Transform of some probability distribution function $f(x)$ defined as $\tilde{f}(u) = \int_0^\infty f(x)x^{u-1}dx$. Then the mean of X denoted by $\bar{X} = \tilde{f}(2)$ and $$\phi_{ij} = \frac{\gamma_i}{\delta_j} = \frac{p_i R_j^2}{L^2}.$$

Accordingly multiplying the above differential equation for REG. 1 by $x^u$ and integrating over the respective interval for REG. 1 yields:

$$f_0((C_0/2)^-)(C_0/2)^u - u\int_0^{C_0/2} f_0(x)x^{u-1}dx =$$

$$-\phi_{00}\int_0^{C_0/2} f_0(x)x^{u+1}dx + \frac{\phi_{00}}{2^u}\int_0^{C_0} f_0(y)y^{u+1}dy$$

For "REG. 2," $C_0/2 < x < C_1/2g$, the forward difference equation is:

$$f_0(x,t+\Delta t) = f_0(x-\delta_0\Delta t,t)(1-\gamma_0 x\Delta t) + f_1(2x,t)2\gamma_1 x\Delta t,$$

$$f_1(x,t+\Delta t)=0$$

With some rearrangement the analytical framework obtains:

$$f_0(x,t+\Delta t)-f_0(x-\delta_0\Delta t,t)=-\gamma_0 x\Delta t f_0(x-\delta_0\Delta t,t)+f_1(2x,t)$$
$$2\gamma_1 x\Delta t,$$

$$f_1(x,t+\Delta t)=0$$

Letting $\Delta t$ approach 0, the analytical framework obtains a set of partial differential equations for $f_i(x,t)$. When $X(t)$ has a steady state distribution from time t to infinity, the analytical framework obtains the following differential equation for the distribution of $f_i(x)$, where $$\dot{f}_i(x) \text{ is } \frac{df_i(x)}{dx}:$$

$$\delta_0 \dot{f}_0(x)=-\gamma_0 x f_0(x)+4g\gamma_1 x f_1(2gx),$$

$$f_1(x)=0$$

The noted expression may be solved by the Mellin Transforms, where $\hat{f}(u)$, $u \geq 1$ is the Mellin Transform of some probability distribution function $f(x)$ defined as $\hat{f}(u)=\int_0^\infty f(x)x^{u-1}dx$. Then the mean of X denoted by $\overline{X}=\hat{f}(2)$ and $$\phi_{ij} = \frac{\gamma_i}{\delta_i} = \frac{p_i R_j^2}{L^2}.$$

Accordingly, multiplying the above differential equation for REG. 2 by $x^u$ and integrating over the respective interval for REG. 2 yields:

$$f_0((C_1/2g)^-)(C_0/2g)^u - f_0((C_0/2g)^+)(C_0/2)^u - u\int_{C_0/2}^{C_1/2g} f_0(x)x^{u-1}dx =$$
$$-\phi_{00}\int_{C_0/2}^{C_0/2} f_0(x)x^{u+1}dx + \frac{\phi_{10}}{2^u \cdot g^{u+1}} \int_{gC_0}^{C_1} f_1(y)y^{u+1}dy$$

For "REG. 3," $C_1/2g<x<C_0$, the forward difference equation is:

$$f_0(x,t+\Delta t)=f_0(x-\delta_0\Delta t,t)(1-\gamma_0 x\Delta t),$$

$$f_1(x,t+\Delta t)=0$$

With some rearrangement the analytical framework obtains:

$$f_0(x,t+\Delta t)-f_0(x-\delta_0\Delta t,t)=-\gamma_0 x\Delta t f_0(x-\delta_0\Delta t,t),$$

$$f_1(x,t+\Delta t)=0$$

Letting $\Delta t$ approach 0, the analytical framework obtains a set of partial differential equations for $f_i(x,t)$. When $X(t)$ has a steady state distribution from time t to infinity, the analytical framework obtains the following differential equation for the distribution of $f_i(x)$, where $$\dot{f}_i(x) \text{ is } \frac{df_i(x)}{dx}:$$

$$\delta_0 \dot{f}_0(x) = -\gamma_0 x f_0(x),$$

$$f_1(x) = 0$$

The noted expression may be solved by the Mellin Transforms, where $\hat{f}(u)$, $u \geq 1$ is the Mellin Transform of some probability distribution function $f(x)$ defined as $\hat{f}(u)=\int_0^\infty f(x)x^{u-1}dx$. Then the mean of X denoted by $\overline{X}=\hat{f}(2)$ and $$\phi_{ij} = \frac{\gamma_i}{\delta_j} = \frac{p_i R_j^2}{L^2}.$$

Accordingly, multiplying the above differential equation for REG. 3 by $x^u$ and integrating over the respective interval for REG. 3 yields:

$$f_0((C_0^-)(C_0)^u) - f_0((C_1/2g)^+)(C_1/2g)^u - u\int_{C_1/2g}^{C_0} f_0(x)x^{u-1}dx =$$
$$-\phi_{00}\int_{C_1/2g}^{C_0} f_0(x)x^{u+1}dx$$

For "REG. 4," $gC_0<X(t)<C_1$, the forward difference equation is:

$$f_0(x,t+\Delta t)=f_0(x-\delta_0\Delta t,t)(1-\gamma_0 x\Delta t),$$

$$f_1(x,t+\Delta t)=0$$

With some rearrangement the analytical framework obtains:

$$f_0(x,t+\Delta t)=0$$

$$f_1(x,t+\Delta t)-f_1(x-\delta_1\Delta t,t)=-\gamma_1 x\Delta t f_1(x-\delta_1\Delta t,t)$$

Letting $\Delta t$ approach 0, the analytical framework obtains a set of partial differential equations for $f_i(x,t)$. When $X(t)$ has a steady state distribution from time t to infinity, the analytical framework obtains the following differential equation for the distribution of $f_i(x)$, where $$\dot{f}_i(x) \text{ is } \frac{df_i(x)}{dx}:$$

$$\dot{f}_0(x)=0,$$

$$\delta_1 \dot{f}_1(x)=-\gamma_1 x f_1(x)$$

The noted expression may be solved by the Mellin Transforms, where $\hat{f}(u)$, $u \geq 1$ is the Mellin Transform of some probability distribution function $f(x)$ defined as $\hat{f}(u)=\int_0^\infty f(x)x^{u-1}dx$. Then the mean of X denoted by $\overline{X}=\hat{f}(2)$ and $$\phi_{ij} = \frac{\gamma_i}{\delta_j} = \frac{p_i R_j^2}{L^2}.$$

Accordingly, multiplying the above differential equation for REG. 4 by $x^u$ and integrating over the respective interval for REG. 4 yields:

$$f_1(C_1^-)(C_1)^u - f_1(gC_0^+)(gC_0)^u - u\int_{gC_0}^{C_1} f_1(x)x^{u-1}dx =$$
$$-\phi_{11}\int_{gC_0}^{C_1} f_1(x)x^{u+1}dx$$

Summing all the differential equations after applying the Mellin transform and appropriate boundary conditions yields:

$$\left(\frac{R_0}{R_1}\right)^2 (C_0)^u f_1(gC_0^+) - (gC_0)^u f_1(gC_0^-) -$$

$$\left(\frac{R_0}{R_1}\right)^2 (C_1/2g)^u f_1(gC_1^-) + (C_1)^u f_1(C_1^-) - u\hat{f}_0(u) - u\hat{f}_1(u) =$$

$$-\phi_{00}\left(1 - \frac{1}{2^u}\right)\hat{f}_0(u+2) + \left(\frac{\phi_{10}}{2^u g^{u+1}} - \phi_{11}\right)\hat{f}_1(u+2)$$

Which can be rearranged and restated as:

$$\left(\left(\frac{R_0}{R_1}\right)^2 - g^u\right)(C_0)^u f_1(gC_0^+) - \left(\left(\frac{R_0}{R_1}\right)^2 \frac{1}{2^u g^u} - 1\right)(C_1)^u f_1(C_1^-) - u\hat{f}_0(u) -$$

$$u\hat{f}_1(u) = -\phi_{00}\left(1 - \frac{1}{2^u}\right)\hat{f}_0(u+2) + \left(\frac{\phi_{10}}{2^u g^{u+1}} - \phi_{11}\right)\hat{f}_1(u+2)$$

Returning to REG. 4, the differential equation for this region can be directly solved to obtain a very simple expression. Where $f_1(x) = V_0 e^{-\phi_{11} x^2/2}$ $C_0 < x < C_1$. Because of the simple form of $f_1(x)$ the Mellin transform can be quickly calculated $\hat{f}_1(u)$. Where $\Delta(u)$ is defined as follows and $\gamma$ is the lower incomplete gamma function is defined as $\gamma(a,x) = \int_0^x e^{-t} t^{a-1} dt$:

$$\Delta(u) = \int_{C_0}^{C_1} e^{\frac{\phi_{11}}{2} x^2} x^{u-1} dx$$

$$= \frac{1}{2}\left(\frac{\phi_{11}}{2}\right)^{\frac{u}{2}} \int_{\frac{\phi_{11}}{2}(C_0)^2}^{\frac{\phi_{11}}{2}(C_1)^2} e^{-y} y^{\frac{u}{2}-1} dy$$

$$= \frac{1}{2}\left(\frac{\phi_{11}}{2}\right)^{-\frac{u}{2}} \left[\gamma\left(u/2, \frac{\phi_{11}}{2}(C_1)^2\right) - \gamma\left(u/2, \frac{\phi_{11}}{2}(C_0)^2\right)\right]$$

Accordingly make the appropriate substitutions for $\hat{f}_1(u) = V_0 \Delta(u)$, $f_1(C_1^-) = V_0 e^{-\phi_{11} C_1^2/2}$ or $f_1(gC_0^+) = V_0 e^{-\phi_{11} g C_0^2/2}$ in the summation of the Mellin transformed differential equations with the appropriate boundary conditions yields:

$$\hat{f}_0(u) = \frac{\phi_{00}}{u}\left(1 - \frac{1}{2^u}\right)\hat{f}_0(u+2) + \frac{V_0}{u}\psi(u).$$

$$\hat{f}_1(u) = V_0 \Delta(u)$$

Where $$\psi(u) = (g^2 - g^u)(C_0)^u e^{-\frac{\phi_{11}}{2} g^2 C_0^2} -$$

$$\left(\left(\frac{1}{2g}\right)^u g^2 - 1\right)(C_1)^u e^{-\frac{\phi_{11}}{2} g^2 C_1^2} -$$

$$u\Delta(u) - \left(\frac{\phi_{10}}{2^u g^{u+1}} - \phi_{11}\right)\Delta(u+2); \text{ and } \Delta(u) = \int_{C_0}^{C_1} e^{-\phi_{11} x^2} x^u du.$$

After expanding $\hat{f}_0(u)$ the following expression is created:

$$\hat{f}_0(u) = V_0 \sum_{k \geq 0} (\phi_{00})^k \Pi_k(u) \psi(u + 2k),$$

where $\Pi_k(u) = \frac{1}{u + 2k} \prod_{i=0}^{k-1} \left(\frac{1 - 2^{-u-2i}}{u + 2i}\right)$ The Mellin transform is utilized to solve for the unknown constant $V_0$ where a normalization condition $\hat{f}(1) = \hat{f}_0(1) + \hat{f}_1(1) = 1$ is obtained. Utilizing the appropriate substitution in the above equations yields:

$$V_0 = \frac{1}{\Delta(1) + \sum\limits_{k \geq 0} (\phi_{00})^k \Pi_k(1) \psi(11 + 2k)}$$

Accordingly, the mean throughput, $\hat{f}(2) = \hat{f}_0(2) + \hat{f}_1(2)$, may be summarized as:

$$\overline{X} = \frac{\Delta(2) + \sum\limits_{k \geq 0} (\phi_{00})^k \Pi_k(2) \psi(2 + 2k)}{\Delta(1) + \sum\limits_{k \geq 0} (\phi_{00})^k \Pi_k(1) \psi(1 + 2k)}.$$

The above expression may be utilized to determine the throughput at a give $X(t)$ and $C(t)$. Furthermore, the above expression may be utilized to select a subset of available channel rates $C(t)$ that maximizes the mean throughput.

Figure 8:
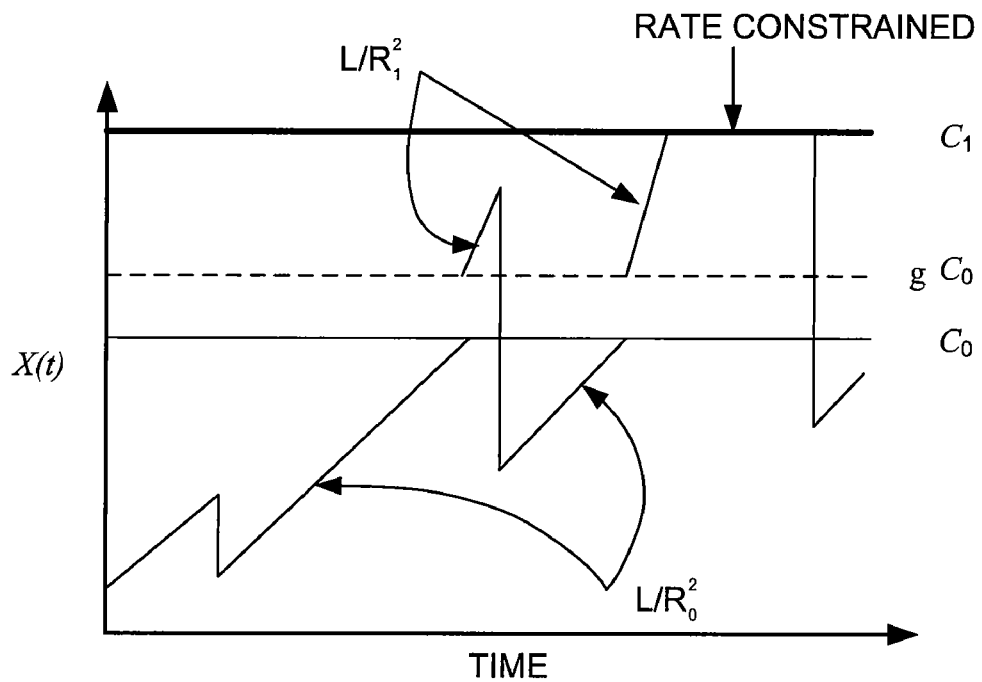
FIG. 8 is a graph diagram illustrating an evolution of a sending rate associated with the sending device over the time period when the sending rate is constrained, according to an embodiment of the present invention.

The analytical framework performs a similar evaluation for the rate constrained multi-rate wireless systems. FIG. 8 is a graph diagram illustrating an evolution of a sending rate associated with the sending device over the time period when the sending rate is constrained, according to an embodiment of the present invention.

Here the sender device is constrained to the window of the receiver device. The receiver advertises a window size $W_{max}$ that is smaller than a peak bandwidth-delay product. In certain embodiment, $W_{max} \leq C_1 R_1$. Consequently, the sender-side TCP window stops growing once it reaches $W_{max}$. Additionally, the sending rate $X(t)$ stops growing once it hits $W_{max}/R_1$ or $C_1$. In this state the sending device should not experience congestion and the TCP window will drop only due to channel errors as shown in FIG. 8. In FIG. 8 it is clear that a density mass exists at $C_1$ and a stationary rate density distribution function $f(x)$ has a discontinuity at $C_1$. Accordingly, to represent this function the analytical framework lets $(f_1)(C_1^-) = (f_1)(x)|_{x=C_1} = A\delta(x - C_1)$ where $A$ is a proportionality constant and $\delta(x)$ is the Dirac Delta function.

The discontinuity does not affect the differential equations associated with regions "REG. 1" for $0 - C_0/2$, "REG. 2" for $C_0/2 - C_1/2g$, "REG. 3" for $C_1/2g - C_0$ and "REG. 4" for $gC_0 - C_1$. However the discontinuity does alter the boundary conditions at $C_1/2g$ and $C_1^-$. The boundary conditions at $C_0^-$ remains unchanged. Accordingly, calculating the first discontinuity includes conditioning $X(t+\Delta t) = C_1/2g$ and applying an appropriate difference equations such as:

$$f_{t+\Delta t, 0}(C_1/2) \frac{\Delta t}{R_0^2} =$$

-continued $$f_{t,0}(C_1/2 - \delta_1 \Delta t)\frac{\Delta t}{R_0^2}(1 - \gamma_1(C_1/2)\Delta t) + Pr\{X(t) = C_1\}(\gamma_1 C_1 \Delta t) =$$

$$f_{t,0}(C_1/2 - \delta_1 \Delta t)(1 - \gamma_1 C_1 \Delta t)\frac{\Delta t}{R_0^2} + A(\gamma_1 C_1 \Delta t)$$

Letting t approach infinity while $\Delta t$ approaches zero yields a boundary condition:

$$\frac{1}{R_0^2} f_0((C_1/2g)^+) = \frac{1}{R_0^2} f_0((C_1/2g)^-) + \gamma_1 C_1 A \text{ where } \gamma_1 = \frac{p_1}{L}.$$

Similarly calculating the second discontinuity includes conditioning on $X(t+\Delta t)=C_1^-$ and applying an appropriate difference equations to arrive at:

$$Pr\{X(t + \Delta t) = C_1\} = \text{ft,}$$

$$1(C_1 - \delta_1 \Delta t)\frac{L\Delta t}{R_1^2}(1 - \gamma_1(C_1)\Delta t) + Pr\{X(t) = C_1\}(1 - \gamma_1 C_1 \Delta t)$$

Letting t approach infinity while $\Delta t$ approaches zero yields a boundary condition:

$$\frac{L}{R_1^2} f(C_1^-) = \gamma_1 C_1 A$$

$$f_1(C_1^-) = \frac{R_1^2}{L} \gamma_1 C_1 A$$

The boundary condition for $C_1^-$ may be utilized to rearrange the boundary condition of $C_1/2g$ to arrive at:

$$\frac{1}{R_0^2} f_0((C_1/2g)^+) = \frac{1}{R_0^2} f_0((C_1/2g)^-) + \frac{L}{R_1^2} f_1(C_1^-)$$

This is essentially the same boundary condition of the unconstrained case. This knowledge enables us to utilize a similar approach to the constrained case when calculating the mean throughput as utilized in the unconstrained case. Accordingly the following equations become useful when calculating the mean throughput:

$$\hat{f}_0(u) = V_0 \Sigma (\phi_{00})^k \Pi_k(u) \psi(u+2k),$$

$$\hat{f}_1(u) = V_0 \Delta(u)$$

A noted difference between the constrained and unconstrained cases are the relationships for the normalization and mean throughput. In the constrained case the expressions are:

$$\hat{f}_0(1) + \hat{f}_1(1) + \int_{C_1^-}^{C_1^+} A\delta(x - C_1)dx = 1 \text{ or}$$

$$\hat{f}_0(1) + \hat{f}_1(1) + A = 1$$

and $$\overline{X} = \hat{f}_0(2) + \hat{f}_1(2) + \int_{C_1^-}^{C_1^+} xA\delta(x - C_1)dx$$

or $\overline{X} = \hat{f}_0(2) + \hat{f}_1(2) + C_1 A$

A and $V_0$ may be related by solving the differential equation in $gC_0 < X(t) < C_1$, and the boundary condition at $X(t) = C_1^-$ as follows:

$$f_1(C_1^-) = V_0 e^{-\phi_{11} C_1^2/2} = \frac{R_1^2}{L} \gamma_1 C_1 A, \text{ or}$$

$$V_0 = \frac{R_1^2}{L} \gamma_1 C_1 e^{\phi_{11} C_1^2/2} \cdot A$$

For simplicity let $$Z = \frac{R_1^2}{L} \gamma_1 C_1 e^{\phi_{11} C_1^2/2}$$

and performing appropriate substitutions in the expression derived for the rate unconstrained case yields:

$$A = \frac{1}{1 + Z(\Delta(1) + \sum_{k \geq 0} (\phi_{00})^k \Pi_k(1) \psi(1 + 2k))}$$

Accordingly the mean throughput may be derived from $$\overline{X} = \frac{C_1 = Z(\Delta(2) + \sum_{k \geq 0} (\phi_{00})^k \Pi_k(2) \psi(2 + 2k))}{1 + Z(\Delta(1) + \sum_{k \geq 0} (\phi_{00})^k \Pi_K(1) \psi(1 + 2k))}.$$

where $\psi(u)$ is defined the same manner as it was defined in the unconstrained case. The analytic expression derived above for the rate constrained and unconstrained instances provide an efficient manner for measuring mean throughput and for determining a subset of available rates that maximize the mean throughput. Furthermore, the boundary conditions provide guidance that indicated the channel rates that result in discontinuities in the sending rate of the sender device.

In another embodiment of the present invention, the analytical expressions may be utilized to maximize throughput by providing suggestions for the a selection of control variables, such as spreading factor, PEP, coding rate, and modulation scheme, that directly relate to channel rates.

In certain embodiments, channel rate $C_i$ and PEP $p_i$ for mode i are functions of the coding rate $r_i$. Thus for a given PEP, the throughput is a function of two coding rates, i.e., $\overline{X}(r_0, r_1)$. The relation between the capacity and coding rate is straightforward and is given by $C_i = \rho_i \cdot C^*$, where $C^*$ is the un-coded channel rate. The PEP is dependent on the coding rate and coding scheme. Accordingly, a specific coding scheme must be utilized or bounds are placed on the PEP based on a given coding rate. For instance, Gilbert-Varshamov bound may specify a bound on a code of length B and information bit length K. The Gilbert-Varshamov bound specifies that there exists a minimum Hamming distance d between any two codes that must satisfy the following expression:

$$2^B \leq 2^K \sum_{j=0}^{d-1} \binom{B}{j},$$

where $d-1 \leq B/2$.

Accordingly, the code can correct at most $t=[(d-1)/2]$ errors which bounds the maximum number of correctable error of any coding rate.

In operation, a wireless system may estimate packet error probabilities from the Gilbert-Varshamov bound. The bit error probability (BEP) is denoted as $p_e$ for the wireless channel rate $C_i$. Given a collection of packets have fixed size of L bits. The collection of packets are broken up into Radio Link Protocol (RLP) frames of size B bits for transmission over a wireless channel. Each radio block contains K bits of information and B-K bits for coding. Therefore, the coding rate of the RLP frames is r=K/B, and the packet error probability (PEP) is $$p = 1 - (1 - p_b)\left[\frac{L}{p^B}\right],$$

where $p_b$ is the radio block error probability. Using the Gilbert-Varshamov bound, for a given coding rate, the analytical framework may determine the maximum number of error bits, t, that are correctable using the coding scheme with coding rate r. Accordingly, $$p_b = \sum_{j=t+1}^{B} \binom{b}{j} p_e^j (1 - p_e)^{B-j}.$$

Figure 9:
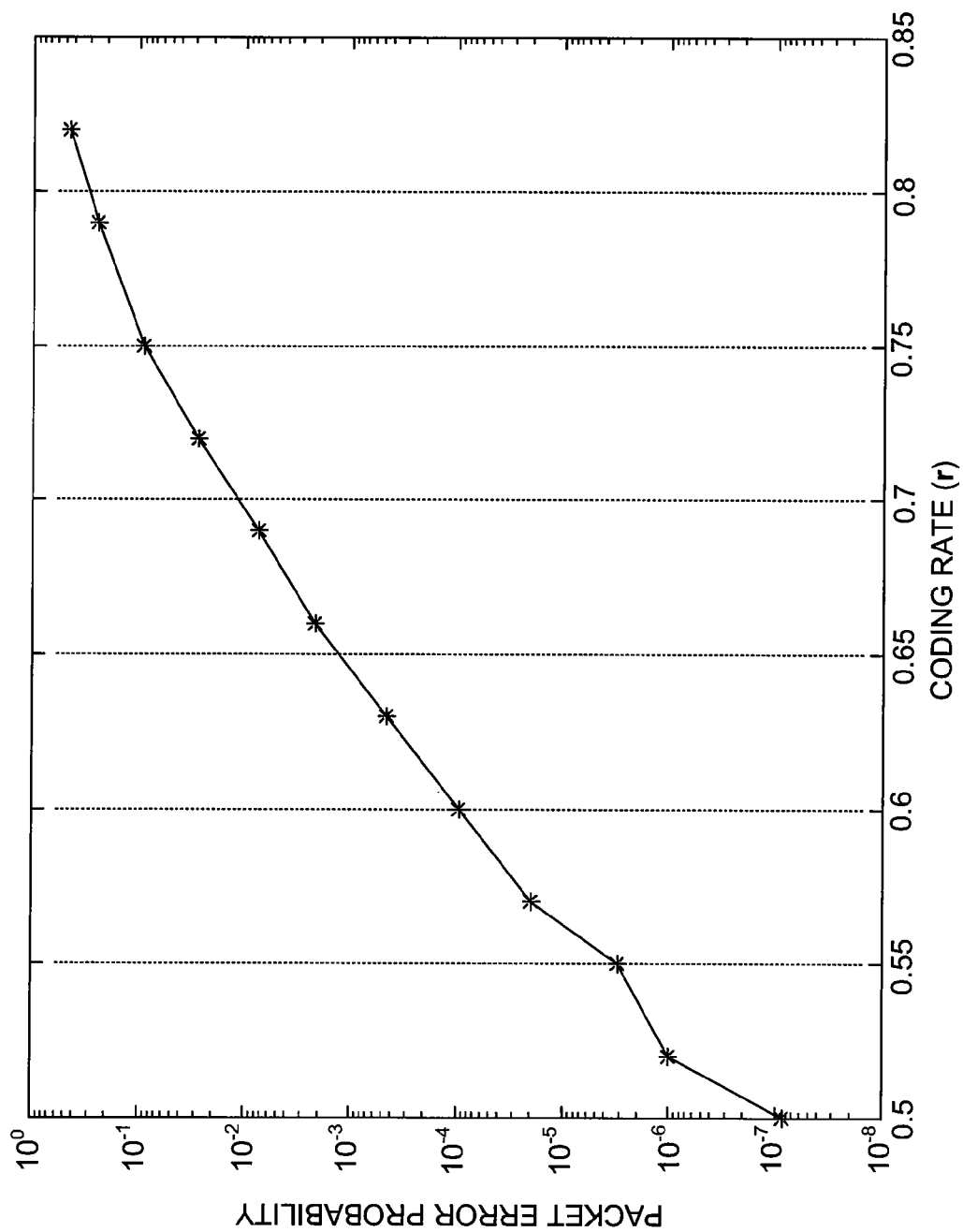
FIG. 9 is a graph diagram illustrating a relationship between the packet-error probabilities and coding rates for a single-channel rate, according to an embodiment of the present invention.

The packet error probability, $p_b$, increases as the coding rate, r, increases. In the un-coded case r=1 and t=0 in which case, $p_b=1-(1-p_e)^B$. This relationship is illustrate in FIG. 9. FIG. 9 is a graph diagram illustrating a relationship between the packet-error probabilities and coding rates for a single-channel rate, according to an embodiment of the present invention.

Figure 10:
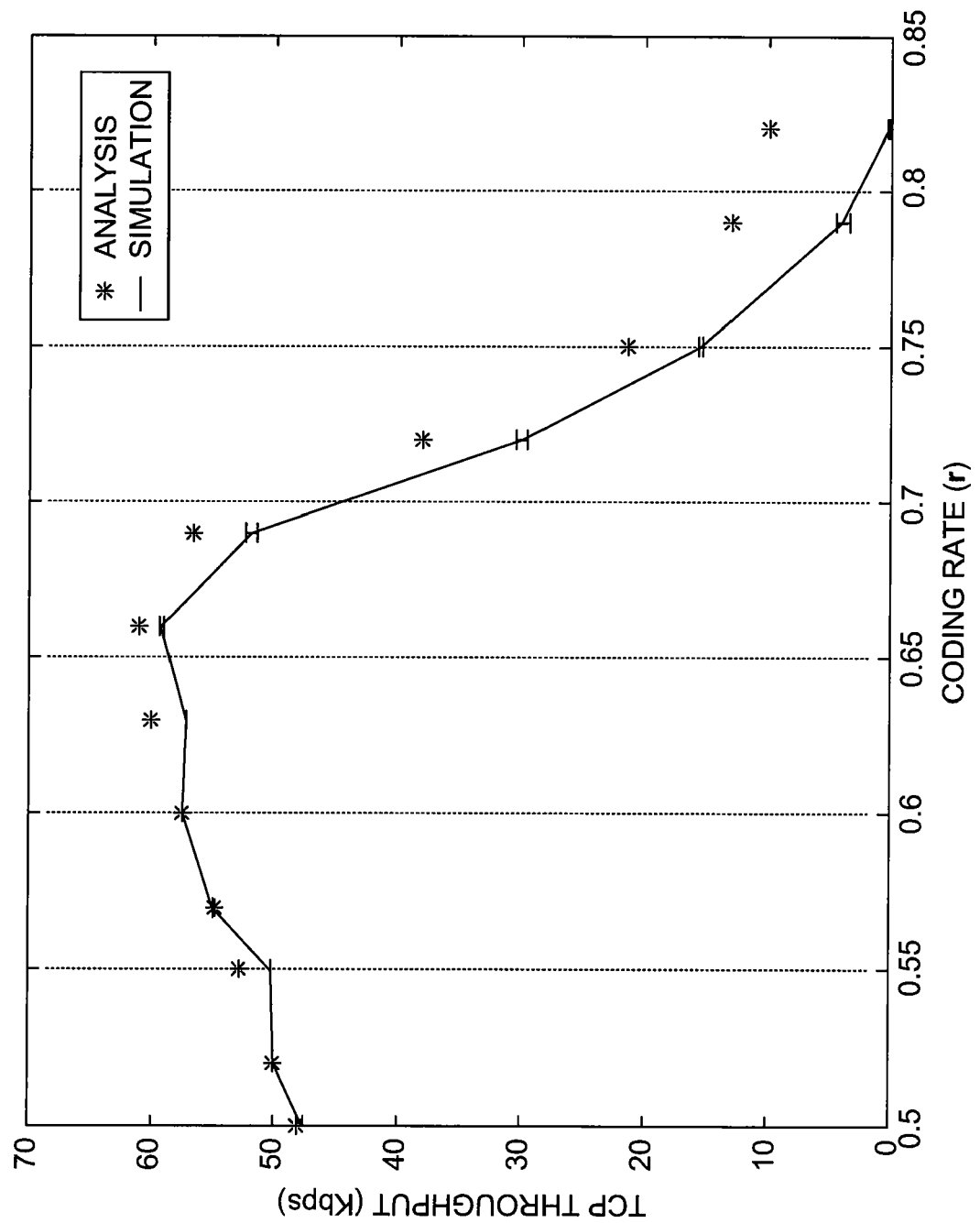
FIG. 10 is graph diagram illustrating a relationship between throughput and coding rates from analysis and simulation for a single-channel rate, according to an embodiment of the present invention.

The analytical framework for TCP throughput is compared against simulations to determine the effectiveness of the analytic framework. Initially, the analytical framework and simulations for a single rate wireless system are compared. FIG. 10 is a graph diagram illustrating a relationship between throughput and coding rates from analysis and simulation for a single-channel rate, according to an embodiment of the present invention. In FIG. 10, the corresponding throughputs of analytical framework and simulation as a function of coding rate are shown. The graph illustrates the close agreement between the analytical framework and simulation and indicates the effectiveness of the analytic framework.

Figure 11:
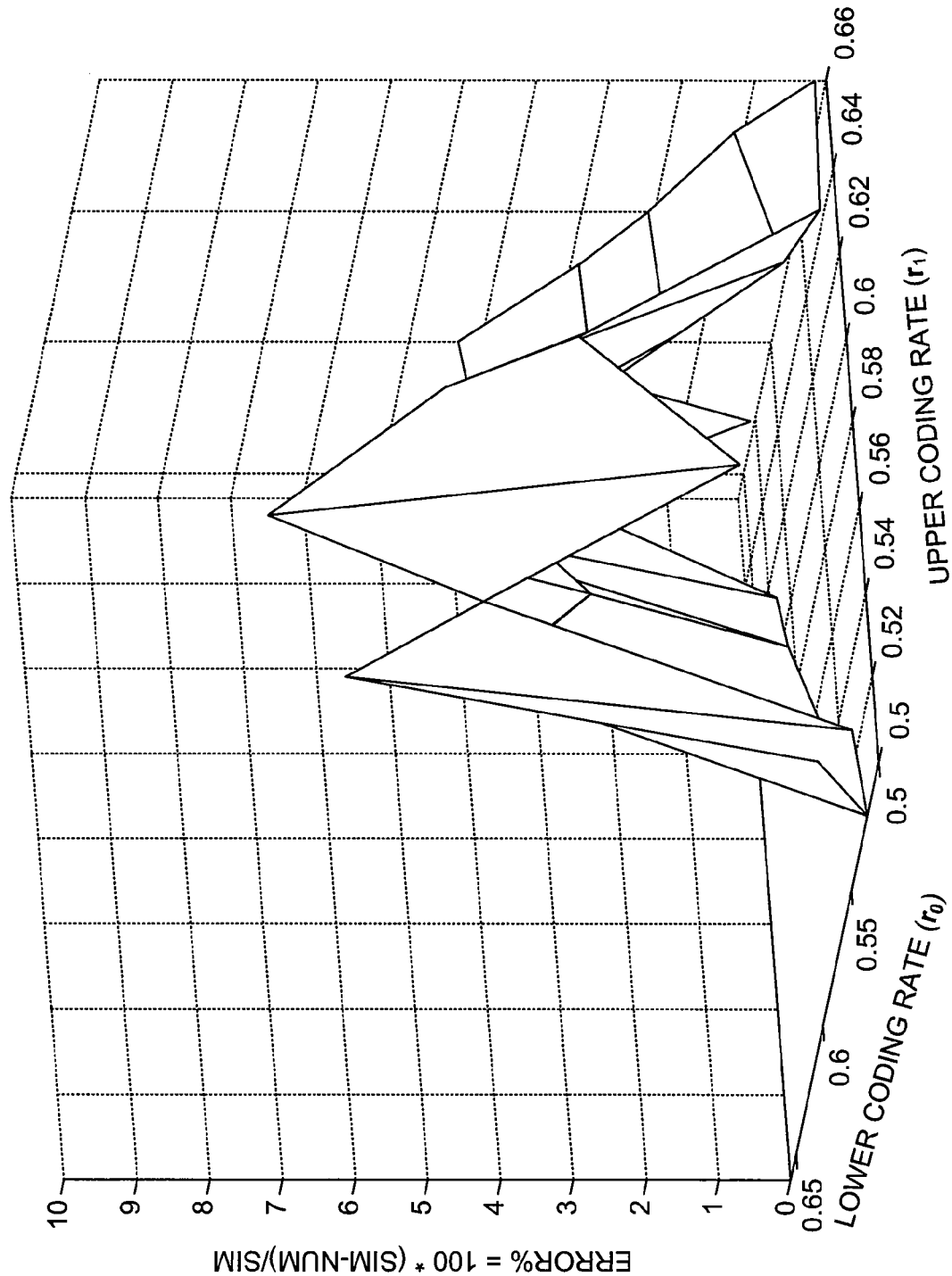
FIG. 11 is a three dimensional graph illustrating error percentages between the analysis and simulation at specified coding rates for multiple-channel rates, according to an embodiment of the present invention.
Figure 12:
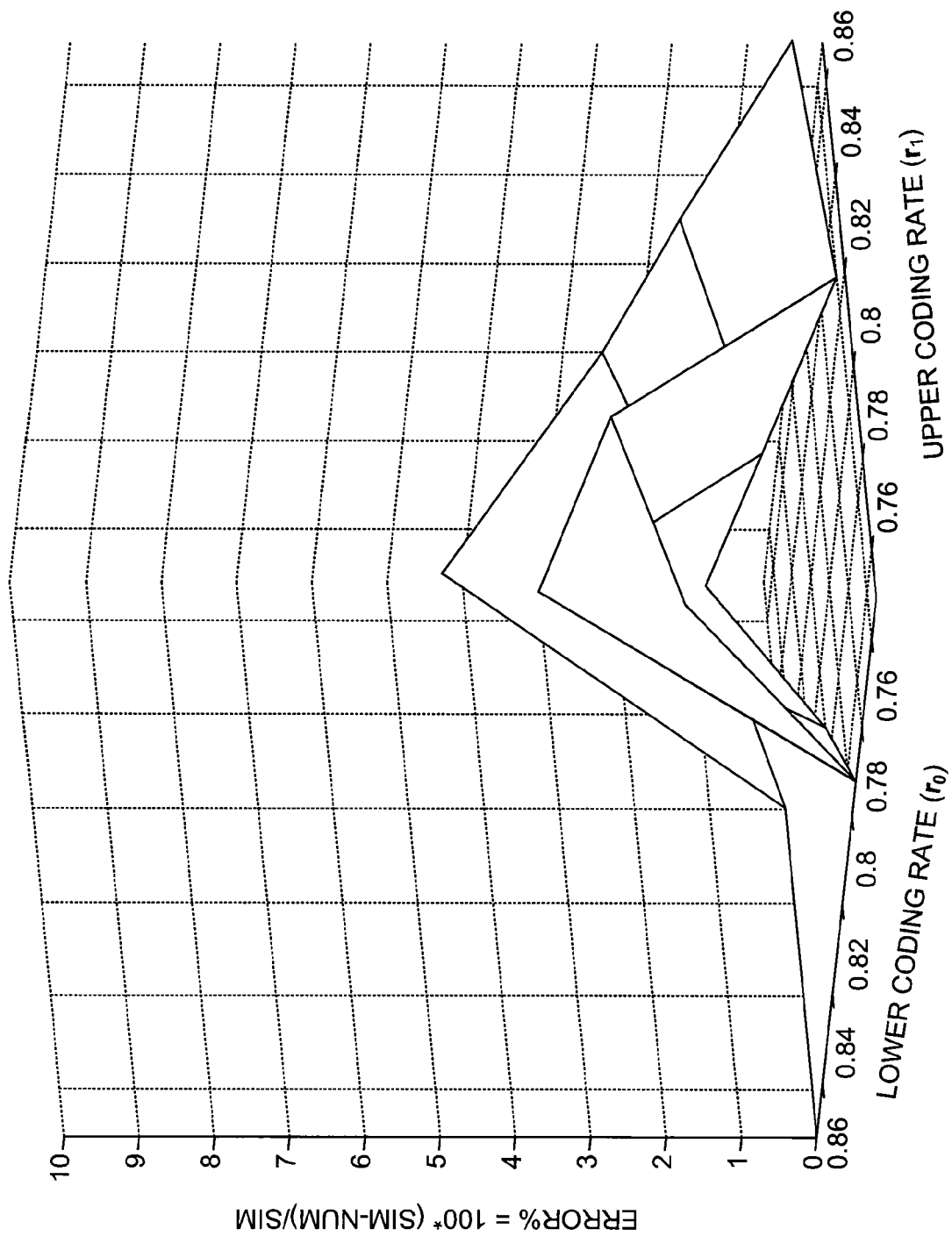
FIG. 12 is a three dimensional graph illustrating error percentages between the analysis and simulation at the specified coding rates with a lower packet-error probability than FIG. 11, according to an embodiment of the present invention.

A similar comparison is made for a multi-rate wireless system and the results of the comparison are illustrated in FIGS. 11 and 12. FIG. 11 is a three dimensional graph illustrating error percentages between the analysis and simulation at specified coding rates for multiple-channel rates, according to an embodiment of the present invention. FIG. 12 is another three dimensional graph illustrating error percentages between the analysis and simulation at the specified coding rates with a lower packet-error probability than FIG. 11, according to an embodiment of the present invention. Both FIGS. 11 and 12 indicate that error percentage between the analytical framework and simulation across all feasible coding rates ($r_0$, $r_1$) on a three dimensional grid for two different bit error probabilities ($10^{-2}$ in FIG. 11, $10^{-3}$ in FIG. 12). Typically, the observed errors between the analytical framework and simulation is less than five percent.

Figure 13:
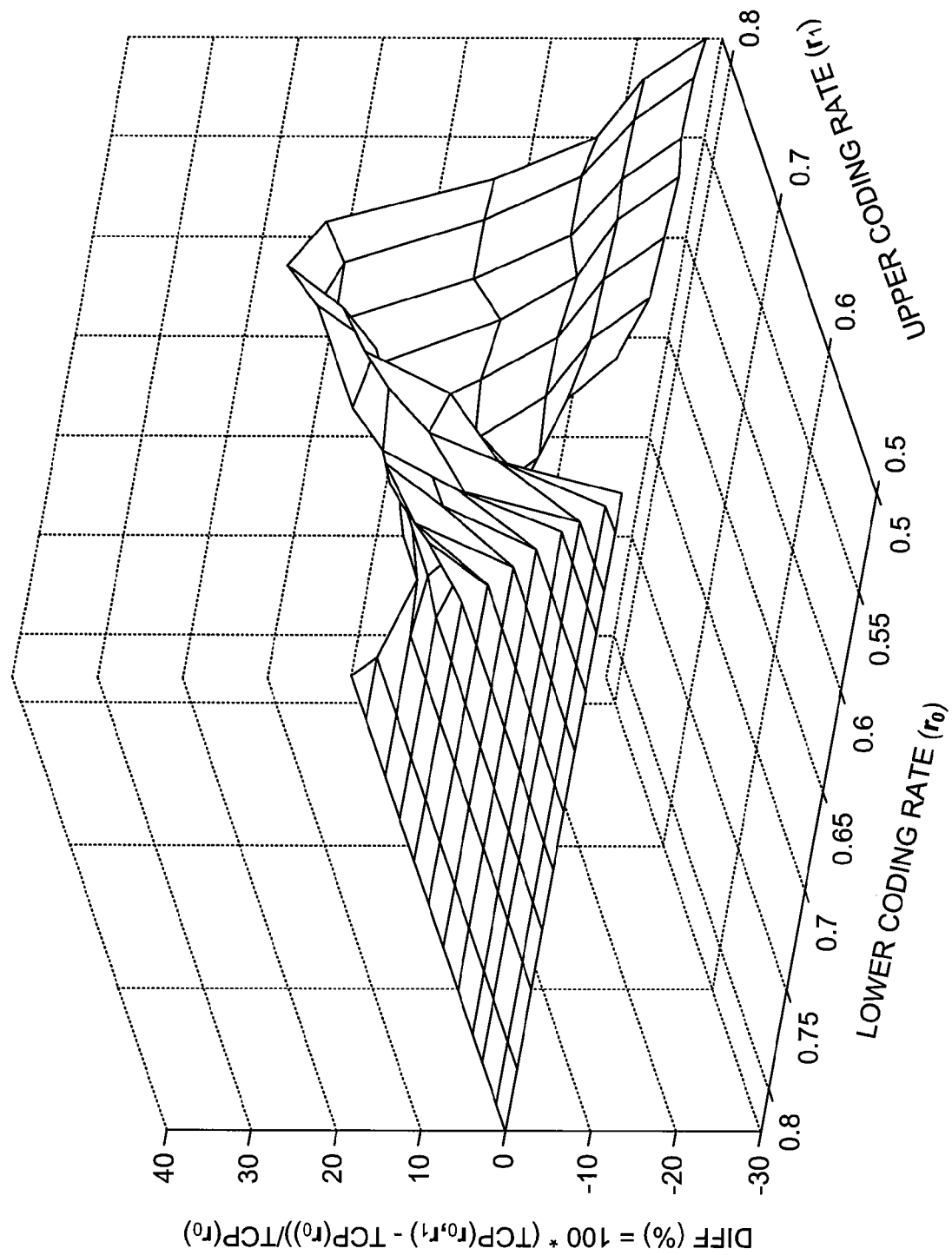
FIG. 13 is a three dimensional graph illustrating differences in throughput between single-channel and multi-channel rates, according to an embodiment of the present invention.
Figure 14:
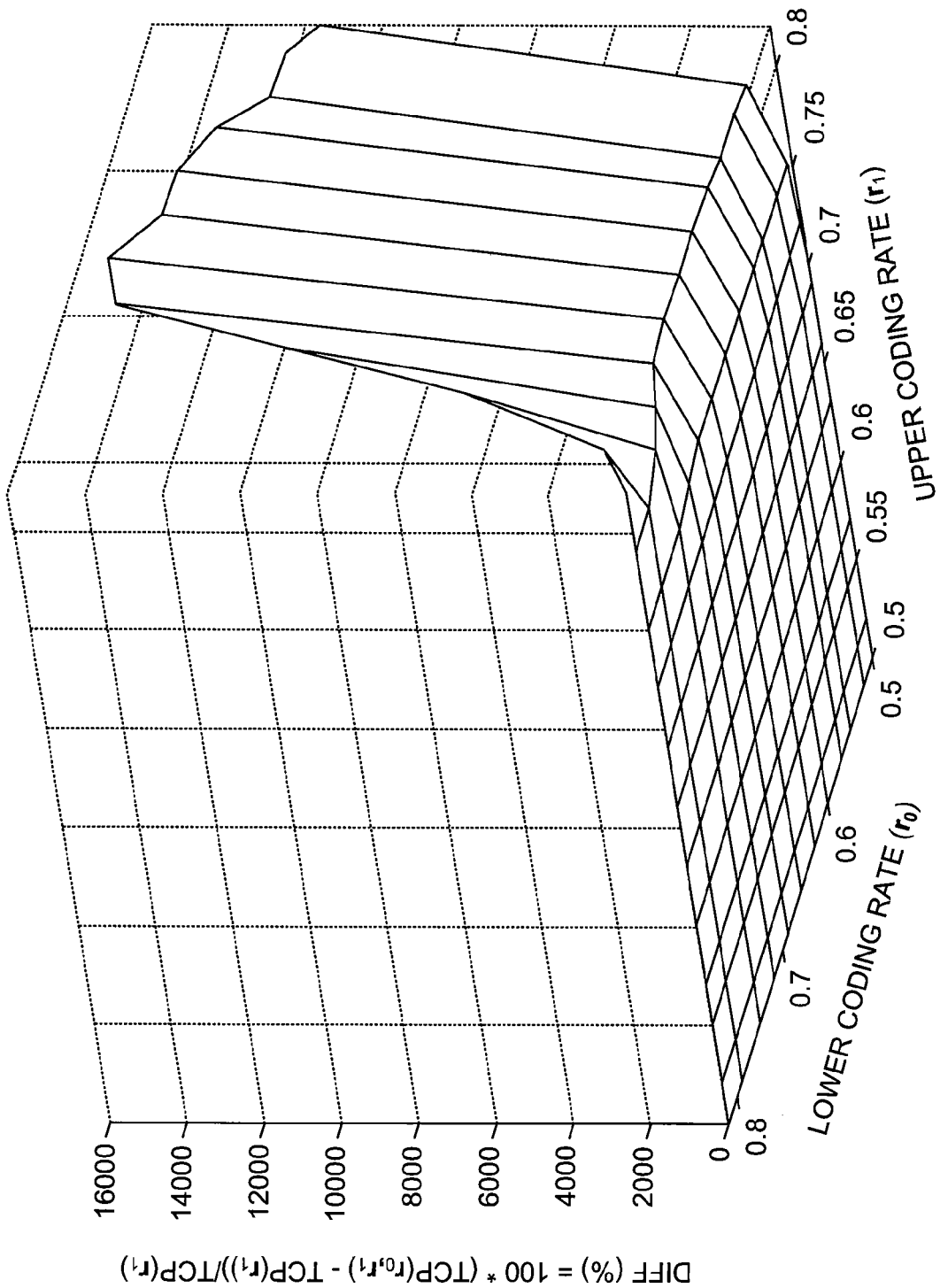
FIG. 14 is a three dimensional graph illustrating differences in throughput between single-channel and multi-channel rates at a higher single channel rate than FIG. 13, according to an embodiment of the present invention.

In FIGS. 13 and 14 the difference in throughput between the single-rate wireless system and multi-rate wireless system are indicated. FIG. 13 is a three dimensional graph illustrating differences in throughput between single-channel and multi-channel rates, according to an embodiment of the present invention. FIG. 14 is a three dimensional graph illustrating differences in throughput between single-channel multi-channel rates at a higher channel rate than FIG. 13, according to an embodiment of the present invention.

Each of the graphs in FIGS. 13 and 14 illustrate that there are regions where there is substantial difference between throughput of the single-rate and multi-rate wireless systems. The graphs capture the efficiencies of the correlation between the sending rate and the presence of at least two channel rates. Accordingly, the single-rate wireless systems may not be the optimal system for tuning performance in TCP systems having elastic applications.

The analytical framework may also be utilized to select channel rates that maximize throughput. In certain embodiments, coding rates, $r_i$, may be utilized to determine the appropriate channel rates. The coding rates that maximize throughput may be calculated from the analytical framework. Because the base station controller implements adaptive resource allocation, by switching between two or more modes associated with different channel rates depending on the TCP sending rate, the allocation of the different channel rate may, in some embodiments, be implemented by altering the coding rate. That is, the base station controller is essentially switching between at least two coding rates, $r_0$ and $r_1$.

Accordingly, the choice of $r_0$ and $r_1$ may directly affect the achieved throughput. For instance, if packet error probability is close to zero then increasing the coding rate increases throughput as well. In this instance, the channel rate may increases as a linear function of the coding rate and because the packet error probability remains negligible, the throughput of the wireless system increases. However, if the packet error probability is large, then increasing the coding rate decreases throughput and eventually reduces it to zero. Therefore, there exists a coding rate that maximizes throughput. In FIG. 10, the graph indicates that as the coding rate increases there is an increase in throughput, and at least one coding rate, $r_{max}=0.656$, that maximizes throughput.

The analytical framework may be utilized to calculate an optimal pair of coding rates. Table I presents the pair of optimal coding rates $r_0$ and $r_1$ obtained from both, the analytical framework and simulations, that maximize the throughput $\overline{X}$ ($r_0$, $r_1$) and the corresponding throughput for different target bit error probabilities $p_e$.

TABLE I

| | Analysis | | Simulation | |
| --- | --- | --- | --- | --- |
| $p_e$ | ($r_0$, $r_1$) | Thr. (Kbps) | ($r_0$, $r_1$) | Thr. (Kbps) |
| $10^{-1}$ | 0.125, 0.125 | 10.85 | 0.125, 0.125 | 8.89 |
| $10^{-2}$ | 0.630, 0.720 | 65.19 | 0.600, 0.660 | 65.66 |

TABLE I-continued

| | Analysis | | Simulation | |
|---|---|---|---|---|
| $\rho_e$ | $(r_0, r_1)$ | Thr. (Kbps) | $(r_0, r_1)$ | Thr. (Kbps) |
| $10^{-3}$ | 0.820, 0.910 | 85.21 | 0.820, 0.870 | 85.35 |
| $10^{-4}$ | 0.910, 0.960 | 91.99 | 0.910, 0.960 | 92.83 |
| $10^{-5}$ | 0.960, 0.990 | 94.65 | 0.960, 0.990 | 94.91 |

In most cases, there is a close match between the optimal coding rates and corresponding throughput obtained from the analytical framework and simulation. The calculation of the throughput at the different bit error probabilities illustrates the robustness of the analytical framework.

In order to quantify the benefits of using at least two coding rates, Table II presents relative increases in throughput as a consequence of using multi-rate wireless systems as compared to single-rate wireless systems for each bit error probability and coding rate region.

TABLE II

| $\rho_e$ | Analysis | Simulation |
|---|---|---|
| $10^{-1}$ | 0% | 0% |
| $10^{-2}$ | 6.9% | 10.9% |
| $10^{-3}$ | 4.2% | 9.1% |
| $10^{-4}$ | 5.3% | 9.0% |
| $10^{-5}$ | 2.7% | 2.4% |

The gain factor is defined as $$100 \frac{X(r_0, r_1) - X(r_{max})}{X(r_{max})},$$

where $r_{max}$ represents the optimum coding rate for the single rate case. For each bit error probability, the gain factor is computed by comparing throughputs at the optimal coding rates for multi-rate and single-rate wireless systems, respectively. As illustrated in Table II, the optimum throughput with adaptive coding is at least as much as that of static coding and higher in several situations, with improvements of more than five percent.

Generally, the multi-rate wireless system outperforms the single-rate wireless system because the base station controller exploits knowledge of the sending rate. Specifically, when the sender device has a small window, it allocates at a low channel rate. The base station controller offers a smaller rate to the sender having a lower bit error probability. As the sending rate increases, the base station controller switches to a high channel rate to effectively transfer the data. Because the single-rate wireless system is oblivious to sending rate, no efficiencies are gained.

Furthermore, as expected, when the bit error probability is very small or very large, i.e., close to zero or one, the achieved throughput gain is negligible. The reason is that if the bit error probability is close to zero or one, regardless of the coding rate, the packet error probability will be close to zero or one, respectively. Accordingly, there is no optimization and the multi-rate system will perform similar to the single-rate systems. However, there exist intermediate scenarios as shown in Table I, where throughput gain is larger, e.g., around ten percent at a bit error probability of $10^{-2}$. Tables I and II confirm that the multi-rate wireless systems are at least as good as single-rate wireless system and, in fact, the multi-rate wireless system may outperform the single-rate wireless systems under some operating conditions.

Figure 15:
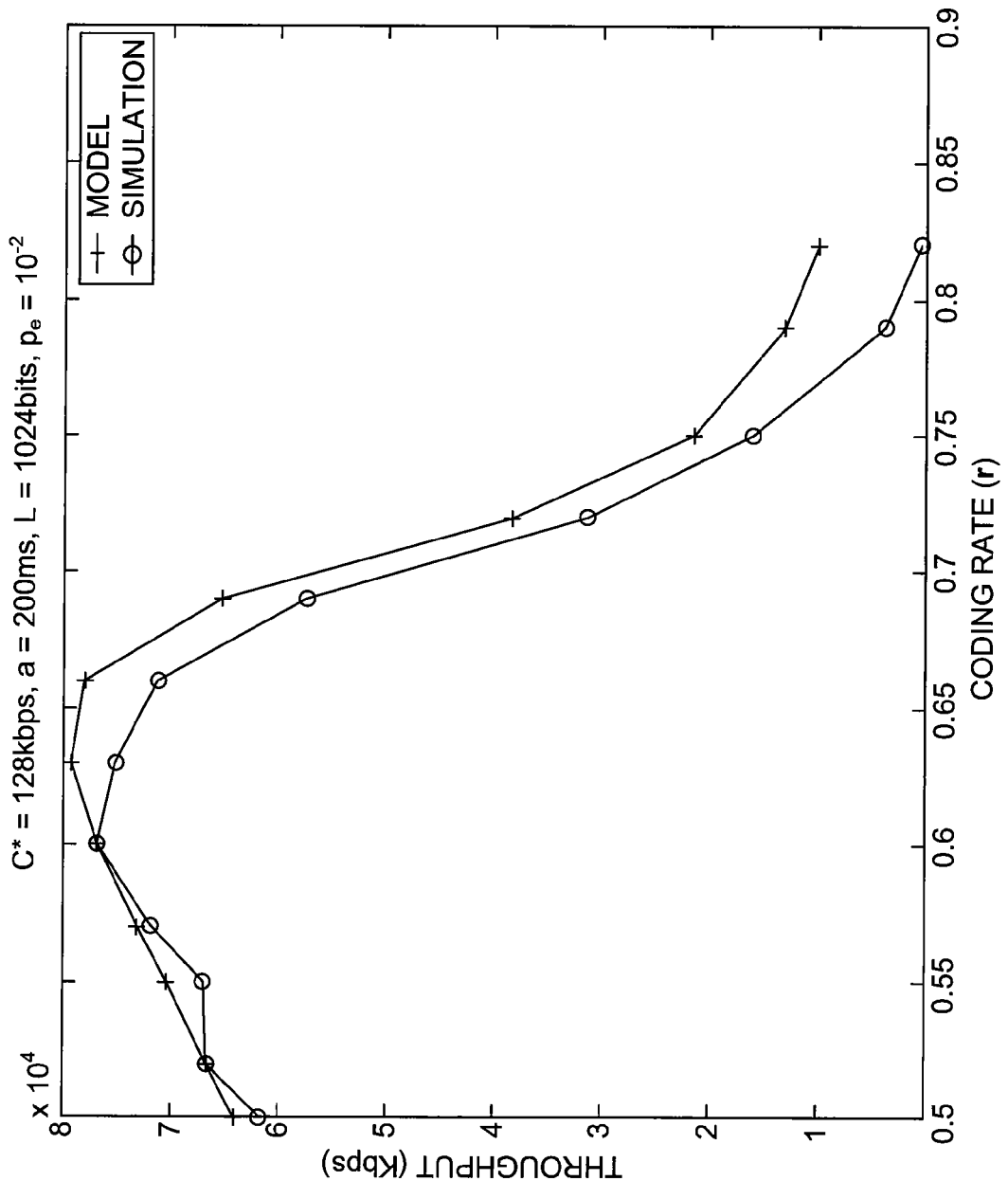
FIG. 15 is a graph illustrating a throughput relationship between the analysis and simulations at specified coding rates when the sending rate is constrained for a single-channel rate, according to an embodiment of the present invention.

The efficacy of the analytical framework is evaluated for a multi-rate wireless system, where the sending rate is constrained by the receiver advertised maximum window size, which is translated into a maximum advertised rate. Similar to FIG. 10, FIG. 15 presents a single-rate wireless system and indicates the effectiveness of the analytical framework for the rate constrained case as compare to a simulation. FIG. 15 is a graph illustrating a throughput relationship between the analysis and simulations at specified coding rates when the sending rate is constrained for a single-channel rate wireless system, according to an embodiment of the present invention. The graph indicates that in the regions of low bit error probabilities, $p_e=10^{-2}$, the analytical framework closely matches simulation results.

Figure 16:
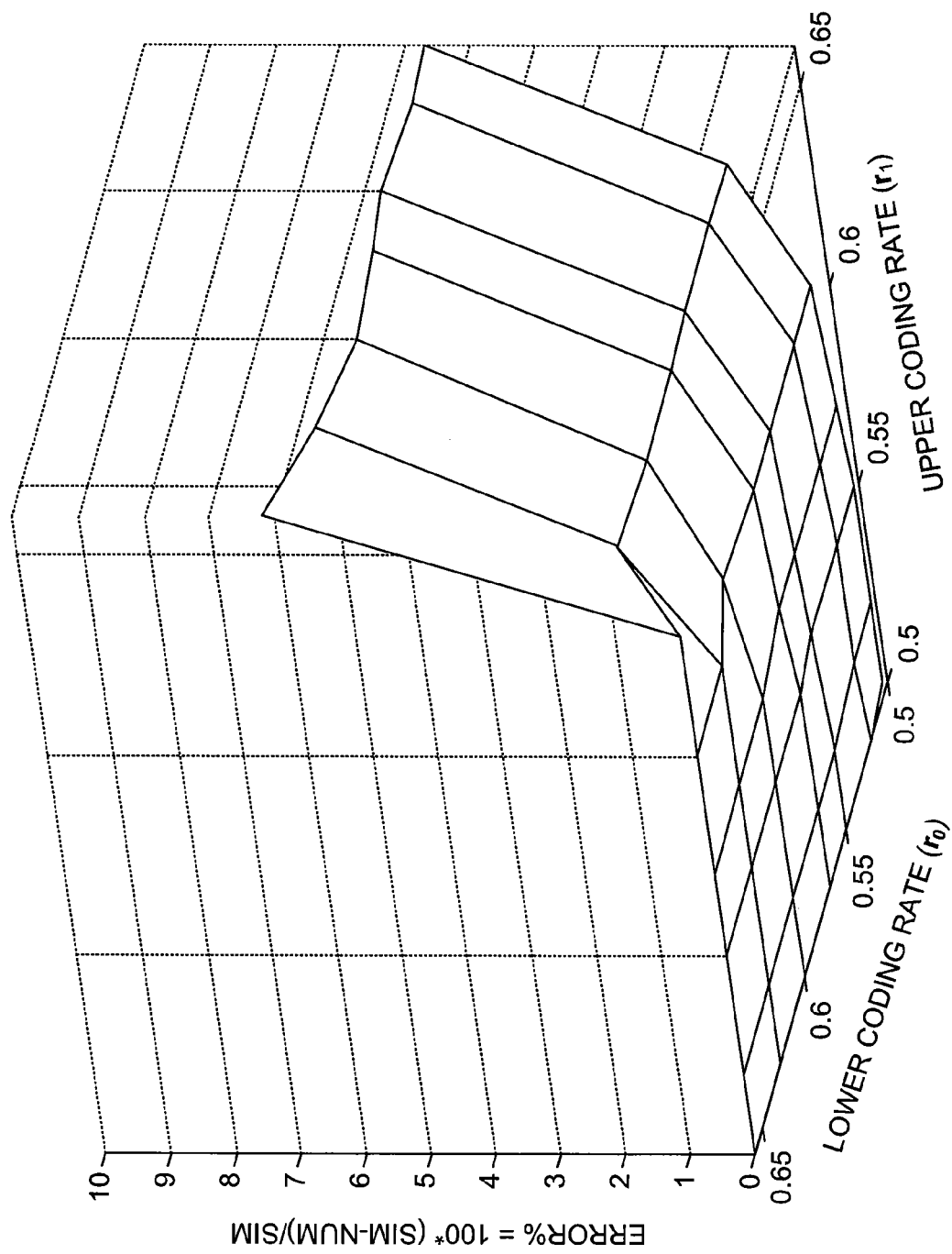
FIG. 16 is a three dimensional graph illustrating error percentages between the analysis and simulation of multi-channel rate when the sending rate is constrained.
Figure 17:
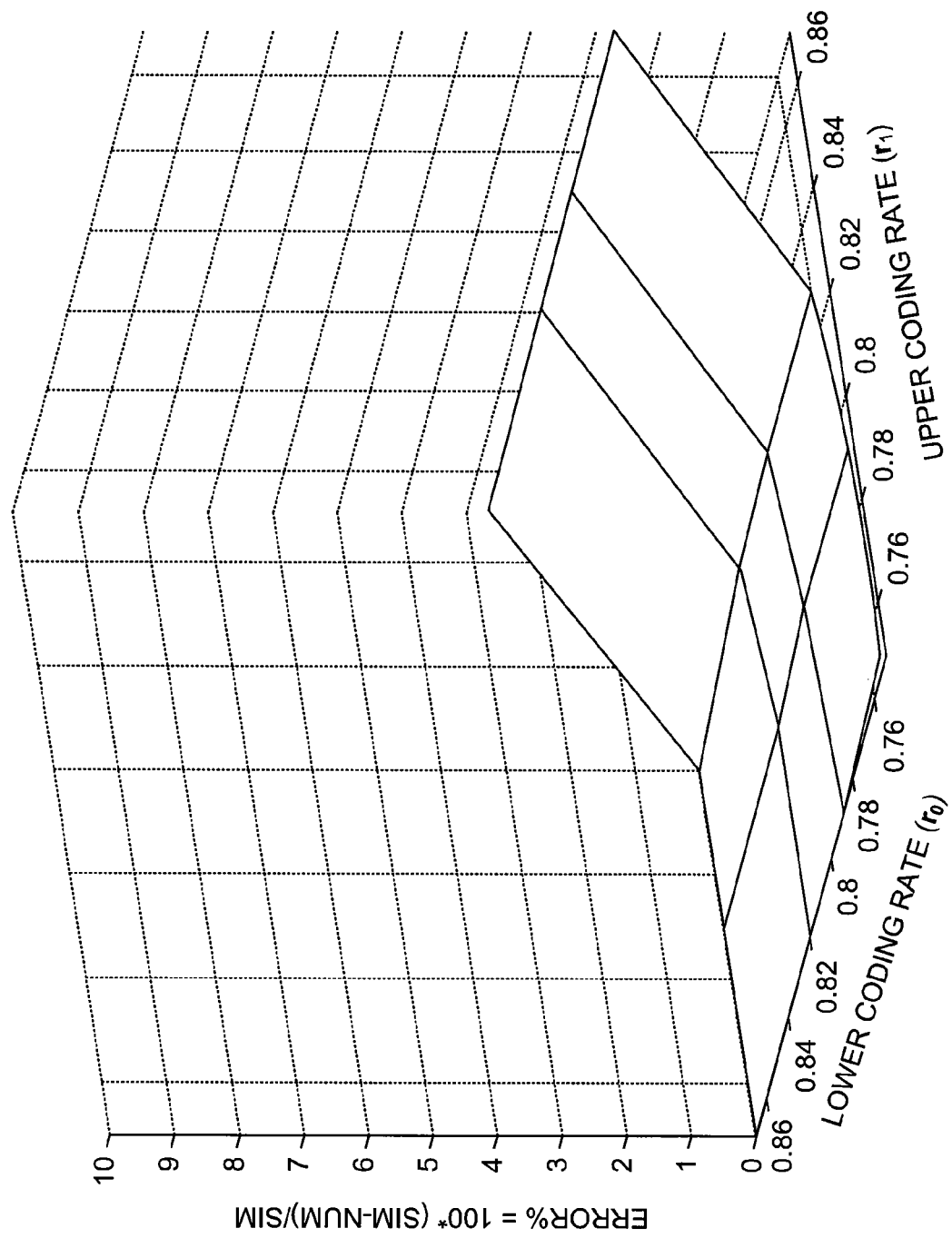
FIG. 17 is a three dimensional graph illustrating error percentages between the analysis and simulation of multi-channel rate when the sending rate is constrained and the multi-channel rate is associated with a lower packet-error probability than FIG. 16, according to an embodiment of the present invention.

The percentage difference between the analytical framework and simulation for the multi-rate wireless systems are plotted in FIGS. 16 and 17 for bit error probabilities of $10^{-2}$ and $10^{-4}$, respectively. FIG. 16 is a three dimensional graph illustrating error percentages between the analysis and simulation of multi-channel rate when the sending rate is constrained. FIG. 17 is a three dimensional graph illustrating error percentages between the analysis and simulation of multi-channel rate when the sending rate is constrained and the multi-channel rate is associated with a lower packet-error probability than FIG. 16, according to an embodiment of the present invention. FIGS. 16 and 17 show that the analytical framework is accurate with the difference from simulation typically less than sever percent.

In some CDMA networks, the dominant control variable that governs the channel rate is the spreading factor. The spreading factor is defined as the ratio of the CDMA chip rate to the actual data rate and relates the channel rate and the bit error probability in the following manner. Let W denote the chip rate of the CDMA system and s, the spreading factor allocated in mode i. Then the channel rate $$C_i = \frac{W}{s_i},$$

and signal to Interference plus Noise ratio (SINR) is $$\frac{E_b^i}{N_0} = \frac{E_c \cdot s_i}{I_0},$$

where $E_c$ is chip energy of the data signal and $I_0$ is the wide-spectrum interference. As $s_i$ decreases, the channel rate $C_i$ increases, but the SINR, which directly affects the bit error probability decreases. Typically, the bit error probability is extremely sensitive to SINR. Accordingly, in practice, some amount of power control is required to prevent a steep rise in the error probability when the spreading factor is decreased. Specifically, the chip energy is "boosted" by a small factor that is a function of the spreading rate to prevent a sharp drop in the quality of service. Consequently, the relationship between the SINR and the spreading factor $s_i$ is modified slightly to $$\frac{E_b^i}{N_0} = \frac{E_c \cdot s_i E(s_i)}{I_0},$$

where $E(s_i)$ is a decreasing function of $s_i$ and represents the factor by which the original chip energy $E_c$ is boosted and $N_o$ is a boost constant. In addition to the spreading factor, $s_i$ the bit error probability may be varied by an appropriate choice of the function $E(s_i)$, which is denoted as the energy profile. The analytical framework may be used to calculate throughput in a multi-rate wireless system that varies the spreading factor and energy profile to transition between rates.

Because signal power is also a resource in the analytical framework, the throughput and energy consumption are calculated. To quantify the latter, the analytical framework applies the notion of normalized energy consumption, which represents the average energy spent per bit as a function of throughput and is computed as follows. The energy spent per bit in mode i is $E_b^i = E_c(s_i E(s_i))$. Further, the mobile session spends a fraction of time $\pi_i$ in mode i and achieves an average throughput $\overline{X}_i$. Accordingly, the normalized energy consumption is given by:

$$E_{norm} = \frac{1}{\overline{X}} \sum_i \pi_i \overline{X}_i \cdot E_b^i$$

$$= \frac{1}{\overline{X}} \sum_i \hat{f}_i(2) E_b^i$$

$$= E_c \frac{1}{\overline{X}} \cdot \sum_i \hat{f}_i(2) r_i E(r_i).$$

Figure 18:
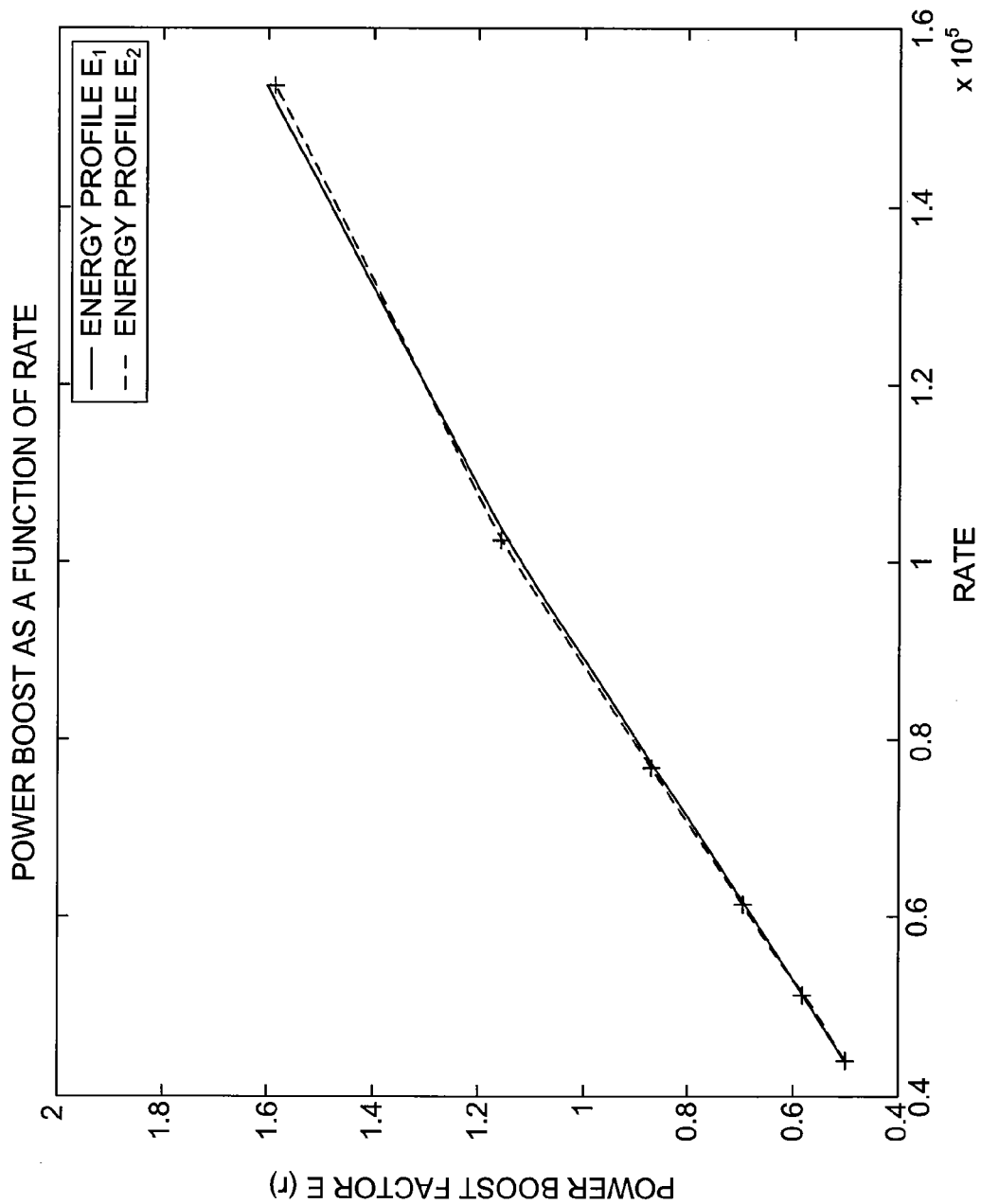
FIG. 18 is a graph illustrating two energy profiles, according to an embodiment of the present invention.
Figure 19:
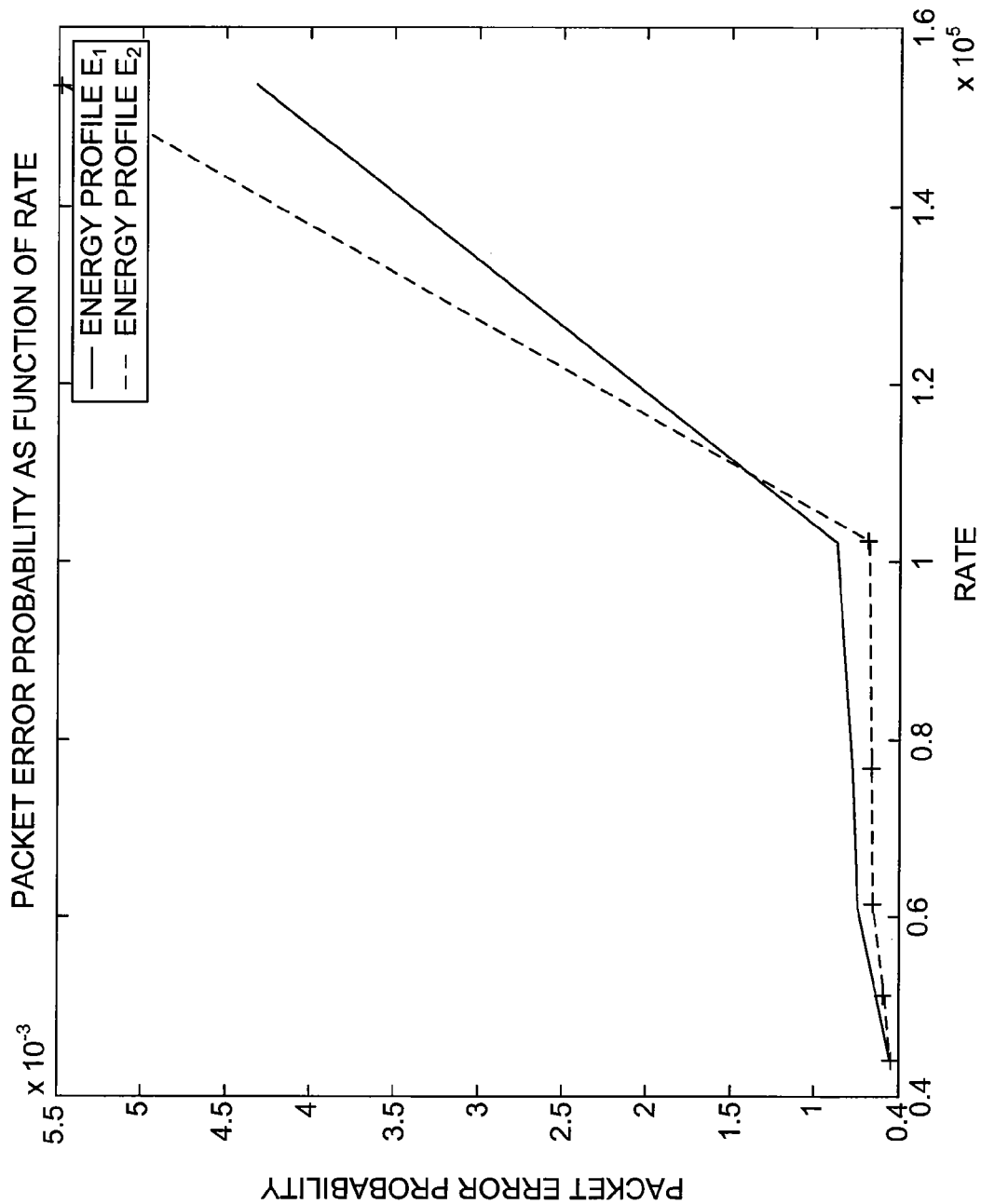
FIG. 19 is graph illustrating the packet-error probabilities associated with the two energy profiles, according to an embodiment of the present invention.

Accordingly, the analytical framework may be utilized to determine the appropriate spreading factor and energy profiles that maximize throughput. FIGS. 18 and 19 provides two different energy profiles $E_1$ and $E_2$ and shows the associated boost in power required and packet error probabilities. FIG. 18 is a graph illustrating two energy profiles, according to an embodiment of the present invention, and FIG. 19 is graph illustrating the packet-error probabilities associated with the two energy profiles, according to an embodiment of the present invention. FIGS. 18 and 19 highlight the sensitivity of error probability to SINR. Specifically, even though the energy profiles $E_1$ and $E_2$ are almost similar, the slight difference results in a large changes in the packet error probabilities.

In an embodiment of the present invention, Tables III and IV present the results for the single-rate and multi-rate cases, respectively, with the energy profile $E_1$. The first column in each table represents the channel rate (and hence spreading factors) used. The last column presents the energy consumption, measured in multiples of $E_c$. The optimal configuration of spreading factors, which was chosen based on the maximum throughput, is marked in bold for both the single and the two rate cases.

TABLE III

Single Rate Wireless System

| | Analysis | | Simulation | |
|---|---|---|---|---|
| C Kbps | Thr. (Kbps) | Energy Consumption ($\cdot E_c$) | Thr. (Kbps) | Energy Consumption ($\cdot E_c$) |
| 76.8 | 56.946 | 13.89 | 56.784 | 13.8144 |
| 102.4 | 75.098 | 13.87 | 75.8112 | 13.7454 |
| 153.6 | 88.594 | 12.83 | 83.195.8 | 12.829 |

TABLE IV

Multi-Rate Wireless System

| | Analysis | | Simulation | |
|---|---|---|---|---|
| $(C_0, C_1)$ Kbps | Thr. (Kbps) | Energy Consumption ($\cdot E_c$) | Thr. (Kbps) | Energy Consumption ($\cdot E_c$) |
| 76.8, 102.4 | 74.545 | 13.77 | 74.912 | 13.77 |
| 76.8, 153.6 | 89.83 | 13.08 | 88.185 | 13.12 |
| 102.4, 153.6 | 98.180 | 13.26 | 96.939 | 13.284 |

The gain in throughput and difference in energy consumption between the multi-rate and single-rate wireless systems, under their respective optimal configurations, are shown in Table V for both energy profiles. The energy savings was computed as $$100 \times \frac{E_{norm}^{static} - E_{norm}^{adaptive}}{E_{norm}^{static}}.$$

TABLE V

Energy Savings

| Energy Profile | Analysis | | Simulation | |
|---|---|---|---|---|
| | Rate Gain | Energy Savings | Rate Gain | Energy Savings |
| $E_1$ | 10.8% | −3.5% | 16.8% | −3.5% |
| $E_2$ | 15.8% | −4.8% | 24.8% | 4.2% |

In Table V, the analytical framework indicates that a small increase in energy consumption, of the order of three to four percent, in conjunction with a two-rate wireless system strategy boosts TCP throughput by ten to fifteen percent as compared to the single rate scenario even when the allowed peak channel rates are the same. The rate gain and energy savings predictions of the simulation are comparable to those of the analytical framework for $E_1$ and for rate gain in $E_2$, but the simulation predicts higher benefits than the analytical framework for energy savings in the case of $E_2$. In fact, it predicts a positive energy savings about four percent, i.e., less energy is required to achieve a higher throughput when the two rate scheduler is used. The differences in energy prediction for $E_2$ are caused due to the analytical framework and simulation picking different optimal configurations in the single rate case, while yielding the same configuration in the two rate case. Specifically, the analytical framework overestimated the throughput in the single rate case for the highest rate 153.6 kbps configuration causing the single-rate wireless system to pick this as optimal. In comparison the simulation chose the 102.4 kbps which has higher energy consumption.

In summary, an optimization engine may utilize the analytical framework to chose multiple rates that maximize throughput associated with a communication session where the sender utilizes an elastic application that varies sending rates or windows. Once the set of rates that maximizes throughput is selected, a scheduler engine associated with the base station controller may dynamically allocate the selected rates. In some instances, the choice is between a low and high channel rate that is controlled by spreading factor or coding rates. Moreover, the analytical framework is operable in wireless systems, where the sender window is unconstrained or where the sender window is constrained by the receiver window.

In another embodiment, a class of allocation policies may be implemented to share high rate data channels among TCP sessions. A preemptive allocation discipline with parameter α uses a TCP transmission rate to make preemption decision. The multi-rate scheduler can monitor a TCP rate for each session and decide what channel to allocate. For example, upon starting a TCP session, a low-rate channel is assigned. When the transmission rate of the TCP session reaches the fundamental channel rate, the multi-rate scheduler makes several decisions. If a supplemental channel with a high rate is available, the multi-rate scheduler assigns the supplemental channel to the TCP session. If no supplemental channel is available, the multi-rate scheduler determines which in-use supplemental channels to preempt with a preemption probability α. The multi-rate scheduler randomly selects one supplemental channel with preemption probability α and preempts the active TCP session by removing the supplemental channel. The result is that the previously active TCP session faces congestion loss and subsequently reduces it sending rate. The multi-rate scheduler reassigns the now available supplemental channel to the TCP session making the request. If the multi-rate scheduler determines that no in-use supplemental channels have a preemption probability α then the TCP session request is denied causing the TCP session to continue to operate at the fundamental channel rate.

Figure 20:
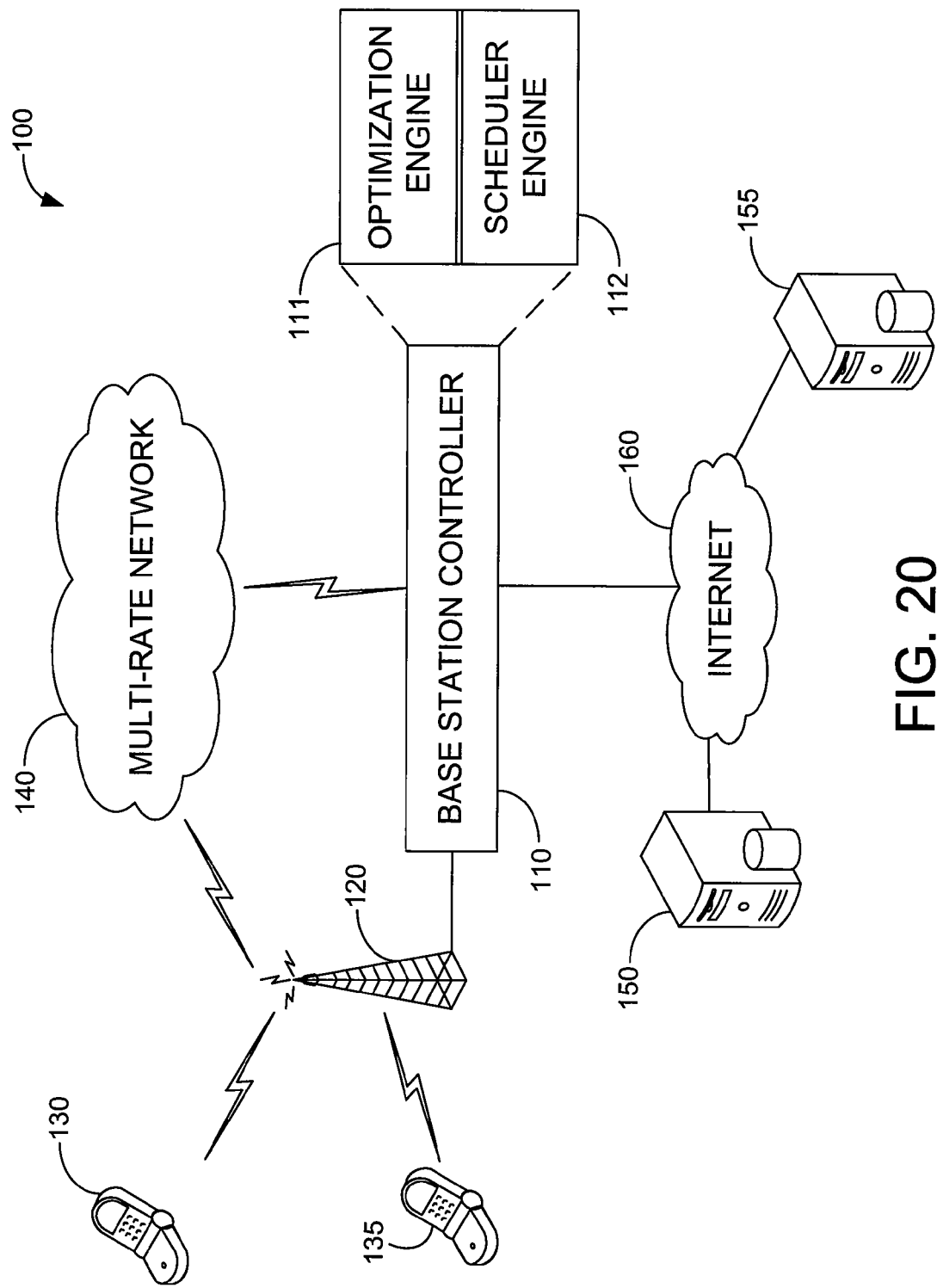
FIG. 20 is another network diagram illustrating an exemplary wireless operating environment with multiple servers and devices, according to an embodiment of the present invention.

In FIG. 20, an embodiment that shares high rate data channels among TCP sessions is illustrated with multiple servers and devices commonly called a multi-user system. As shown, FIG. 20 is similar to FIG. 1 which illustrated a single TCP session scenario. FIG. 20 illustrates the embodiment with multiple TCP sessions.

The preemption probability α is a system parameter than can be optimized in order to maximize TCP throughput. The preemption probability α may be calculated as a function of TCP session throughput and supplemental channel occupancy. Further details on the preemption probability α and other policies may be gathered from "Modeling TCP in a Multi-Rate Multi-User CDMA System" by Majid Ghaderi, Ashwin Sridharan, Hui Zang, Don Towsley, and Rene Cruz, "TCP-Aware Rate Allocation in Multi-Rate Multi-User CDMA System" by Majid Ghaderi, Ashwin Sridharan, Hui Zang, Don Towsley, and Rene Cruz, and "TCP-Aware Channel Allocation in CDMA Network" by Majid Ghaderi, Ashwin Sridharan, Hui Zang, Don Towsley, and Rene Cruz, which are all herein incorporated by reference.

In another embodiment of the present invention, if a TCP session already occupies a supplemental channel, it may be possible for the TCP session to reduce its transmission rate below the supplemental channel rate. This may occur due to congestion or channel errors. As a result, the multi-rate scheduler can de-allocate the supplemental channel from the TCP session and re-assign the fundamental channel to the TCP session.

In a wireless environment, a single cell with N continuously backlogged TCP sessions transferring data over the downlink is assumed. Hence, there are N fundamental channels that can be simultaneously used by all users.

The cell is assumed to have K high rate supplemental channels, such that at any instant in time up to $K \leq N$ users can transmit at the higher rate.

It is assumed that the fundamental channel has rate $C_0$ and the supplemental channel a rate of $C_1$. Clearly $C_0 \leq C_1$. At each point in time, the scheduler knows which type of channel is to be assigned to each TCP session. While the fundamental channel is always available, the allocation of high rate channels is arbitrated by the wireless scheduler because $K \leq N$.

The packet error probability is implicitly assumed to be a function of the assigned channel and denoted by $p_0(p_1)$ when the assigned channel rate is $C_0(C_1)$. Note that typically $p_0 \leq p_1$, reflecting the impact of smaller codewords to achieve higher channel rates.

It is assumed the presence of power control to primarily combat fast fading and interference effects. This is true in current systems where fast closed-loop power control tracks a specified target SINR (or equivalently target FER).

It is assumed no (or a very small) buffer at the base station. Hence, TCP experiences congestion if its sending rate exceeds the maximum allocated channel rate.

One can note that modern cellular systems can support up to four or more different supplemental channel rates. However, obtaining succinct analytical expressions for TCP throughput even for three rates is quite difficult.

In an embodiment of the present invention, the TCP-aware channel allocation scheme comprises a preemptive allocation discipline with parameter α that utilizes the TCP transmission rate to make preemption decisions. Specifically, it is assumed that the wireless scheduler can monitor the TCP rate of each session and, based upon it, decides what channel to allocate. The mechanism works in the following fashion:

1. Upon starting, a TCP session i is assigned a low-rate channel with rate $C_0$.

2. Since the TCP rate increases additively (in the absence of loss), when the transmission rate of the session reaches $C_0$, the capacity offered by the fundamental channel, the scheduler executes the following decision mechanism:

(a) If a supplemental channel $C_1$ is free i.e., less than K supplemental channels are occupied, then the session is always assigned the supplemental channel.

(b) Otherwise, it is allocated a supplemental channel with probability (α). Since at most K users can utilize the high rate channel, this means that with probability α, a session already utilizing the high-rate channel is preempted to accommodate the requesting session. The session to be preempted is chosen randomly with probability 1/K. It is noted that the preempted session faces a congestion loss with probability one since its current transmission rate must have been greater than $C_0$ and hence immediately halves its sending rate.

(c) If the supplemental channel request is denied, which happens with probability 1−α, then the session experiences a congestion loss with probability one and immediately halves its sending rate, in this case to $C_0/2$.

3. Finally, if a session occupying the supplementary channel drops its sending rate to less than that of the supplementary channel rate, either due to congestion or channel errors, its supplementary channel is de-allocated and it is assigned a fundamental channel. This makes sense, since it frees up resources that would not be utilized by the TCP session.

The preemption probability α is a system parameter that needs to be optimized in order to maximize TCP throughput.

In an embodiment of the present invention, an analytical model to compute the throughput in a system is presented. From the perspective of a TCP session, such a multi-rate system results in the session being in either of two distinct states corresponding to whether it is allocated a fundamental or supplemental channel. Each type of channel has different channel capacities, round trip times and packet error probabilities $(C_0, R_0, p_0)$ and $(C_1, R_1, p_1)$ respectively. Given the operation of the proposed scheduler, the state of a session, is decided by two factors: a) its own sending rate or instantaneous throughput, and b) the supplemental channel occupancy, both of which the scheduler utilizes in channel allocation. The latter is critical since it reflects the impact of the multi-user resource sharing aspect of the system. Specifically, whether there are K or less supplementary channel allocations influences both the probability that the session receives a supplemental channel, as well as the rate at which it itself is preempted from a supplemental channel.

Now, the supplementary channel occupancy in turn depends on the rate at which sessions in the fundamental channel state request the supplementary channel, which is actually a function of the time a session spends in each state (fundamental or supplemental). This essentially closes the loop in the sense that the state of the TCP session is a function of the supplementary channel occupancy, which itself depends on the state of each session.

A natural approach to analyze such a system with coupled variables is the fixed-point method, which in this case, works as follows. The instantaneous throughput distribution equations is derived for a TCP session given the supplementary channel occupancy statistics. Note that there is a one-to-one relation between the instantaneous TCP throughput and session state. Next, the newly computed throughput equations are utilized to update the supplementary channel occupancy statistics. These iterations are repeated until a desired convergence criteria is met.

In order to capture the evolution of TCP dynamics in the dynamic two-rate environment, starting with the model, preemption from a supplemental channel as well as denial of the supplemental channel are incorporated. Assumptions are stated regarding TCP dynamics as well as the following: 1. Let $i=0(1)$ denote that the session is allocated a fundamental (supplementary) channel. 2. All TCP sessions are assumed to be homogeneous in the sense that they have the same propagation delay a. Hence, their round trip time in state i is given by $R_i=a+L/C_i$ where L is the packet size. It is noted that the assumption of homogeneity is made in this work only for purposes of illustration of the model. As discussed below, the model can readily tackle heterogeneity as well. 3. In congestion avoidance mode, the TCP sending rate of a session, when in state i, grows at a linear rate of $L/R_i^2$ bits/sec$^2$ in the absence of loss. 4. It is assumed that the channel losses can be modeled by an inhomogeneous Poisson process with rate $p_i X(t)$, $i=0, 1$ at time t, where $p_i$ is the packet loss probability. 5. Let $f_i(x, t)$ denote the density function of the instantaneous rate $X(t)$ in state i. Then $f(x, t)=f_0(x, t)+f_1(x, t)$, where $f(x, t)$ denotes the density function of $X(t)$. 6. Let q denote the probability that the session is allowed to transition from $i=0$ to $i=1$, i.e., its request for a supplementary channel is honored. Let v denote the rate at which a session is preempted from a supplementary channel, i.e., transitions from $i=1$ to $i=0$. It is noted that these quantities are computed based on the supplementary channel occupancy.

The following terms are defined as follows:

$$\phi_{ij} = \frac{p_i R_j^2}{L_2}, \delta_i = \frac{L^2}{R_i^2}$$

for $i=0, 1$ and $$\frac{R_0}{R_1}.$$

Using techniques from fluid analysis, the differential equations can be written for the evolution of the steady-state distribution $f(x)$ of the instantaneous throughput $X(t)$. Then, by applying Mellin transforms, which is defined as $$\hat{f}_i(u) = \int_0^\infty f_i(x) x^{u-1} dx,$$

the differential equations can be solved to obtain the steady state probability ($\hat{f}_i(1)$) and throughput ($\hat{f}_i(2)$) in each state i. This means TCP throughput may be solved given by:

$$\overline{X} = \hat{f}_0(2) + \hat{f}_1(2) = \frac{\hat{\Delta}(2) + \sum_{k \geq 0} (\phi_{00})^k \prod_k (2)\psi(2+2k)}{\hat{\Delta}(1) + \sum_{k \geq 0} (\phi_{00})^k \prod_k (1)\psi(1+2k)}$$

where, $$\psi(u) = \left(\frac{g^2}{q} - g^u - \frac{g^u}{2^u}\left(\frac{1-q}{q}\right)\right)(C_0)^u \Delta(gC_0) - \left(\frac{g^2}{(2g)^u} - 1\right)(C_1)^u \Delta(C_1) -$$
$$u\hat{\Delta}(u) - v\left(\frac{1}{(2g)^u} - \frac{1}{\delta_1}\right)\hat{\Delta}(u+1) - \left(\frac{\phi_{10}}{(2g)^u} - \phi_{11}\right)\hat{\Delta}(u+2)$$

and $$\Delta(x) = e^{-(\frac{\phi_{11}}{2})x^2 - (\frac{v}{\delta_1})x}$$
$$\hat{\Delta}(u) = \int_{gC_0}^{C_1} \Delta(u) x^{u-1} du.$$

Above, the TCP throughput was computed for a single session given supplementary channel assignment probability q and preemption rate v. Now, the supplementary channel occupancy process is modeled as a Markov chain where the state, i, is equal to the number of concurrently active supplementary channels. Clearly, $0 \leq i \leq K$. Now, let $\lambda$ and $\mu$ denote, respectively, the rates at which a single user requests and releases a supplementary channel conditioned upon there being one available. It is assumed that both processes are exponentially distributed, which is a reasonable assumption for large N and K. Denoting the stationary distribution of the Markov chain by $\pi$, it is seen that $$\pi_i = \binom{N}{i}\left(\frac{\lambda}{\mu}\right)^i \pi_0$$

where $$\sum_{i=0}^{K} \pi_i = 1.$$

It now remains to compute $\lambda$ and t. Since $\lambda$ is the rate at which a session requests a high-rate channel, it is essentially equal to the rate at which the TCP rate crosses the low channel rate boundary X(t)=$C_0$ conditioned on a supplementary channel being available. This is simply equal to $\lambda \Delta t$, $\Delta t \to 0$ and can be computed as follows:

$$\lambda \Delta t = P\{(C_0 - \delta_0 \Delta t \leq X(t) \leq C_0) \text{ and (no loss in } [t, t+\Delta t]) \mid X(t) \leq C_0\} = \frac{(1 - p_0 C_0 \Delta t) f_0(C_0 - \delta_0 \Delta t, t)(\delta_0 \Delta t)}{\hat{f}_0(1)}$$

In the limit, as $\Delta t \to 0$ and $t \to \infty$, the following equation is obtained:

$$\lambda = \frac{\delta_1 f_1((gC_0)^+)}{q \hat{f}_0(1)}.$$

To compute $\mu$, it is noted that the Mellin transform analysis discussed above provides expressions for $\hat{f}_0(1)$ and $\hat{f}_1(1)$ which are the steady-state probabilities of being in low rate and high rate regions respectively. It is then straightforward to illustrate that $$\mu = \frac{\hat{f}_0(1)}{\hat{f}_1(1)} \lambda.$$

The relevant supplementary channel occupancy statistics can now be computed in a straightforward fashion as follows:

1. The probability q that a session in state i=0 requesting the supplemental channel, will be assigned a channel is given by:

$$q = (1 - \pi_k^0) + \alpha \pi_k^0 = 1 - (1-\alpha)\pi_k^0,$$

where, $\alpha$ is the scheduler parameter and $\pi_k^0$ is the conditional probability that all K supplemental channels are occupied given that a user is about to request a supplemental channel. Let n(t) be the number of supplemental channels occupied at time t. It is assumed that user u is the requesting user. The metric in question can be computed as follows:

$$\pi_i^0 = Pr\{n(t) = i \mid C_u(t) = C_0\} = \frac{(N-i)\pi_i}{\sum_{j=0}^{K}(N-j)\pi_j}$$

2. The rate at which a user in state i=1 is preempted from the supplementary channel is given by:

$$v = \frac{\alpha}{K}\lambda(N-K)\pi_k,$$

where $\pi_k^1$ is the conditional probability that all K supplemental channels are occupied given that a user has a supplemental channel. Using the same technique above, the following can be computed:

$$\pi_i^1 = \frac{i\pi_i}{\sum_{j=0}^{K} j\pi_j}$$

Using a fixed-point iteration technique, the mean TCP throughput can be computed in multi-user systems.

With the aforementioned equations and variables, various results can be calculated with the equations discussed above.

Figure 21:
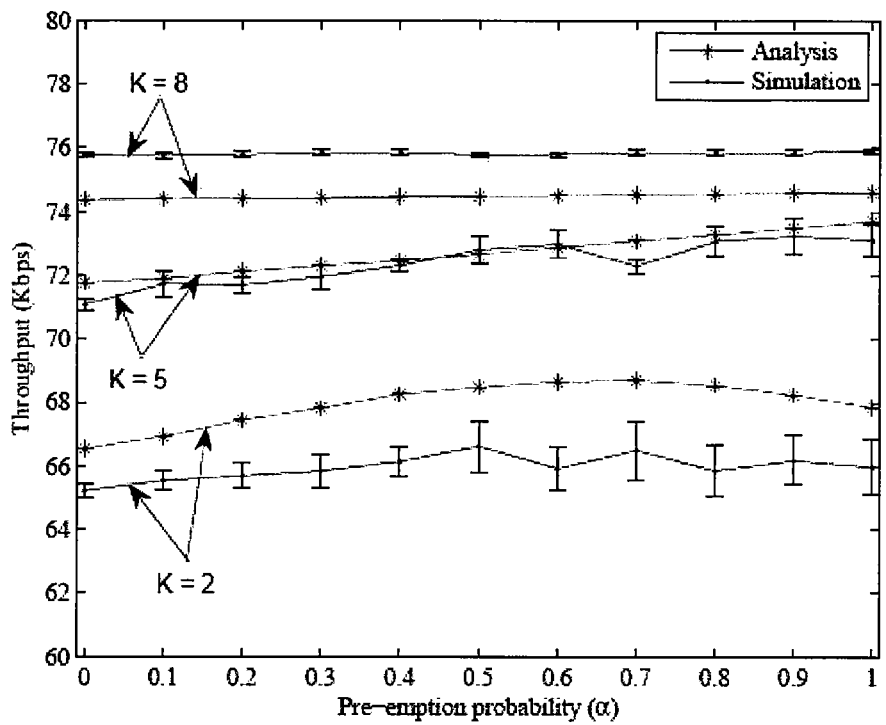
FIG. 21 is a graph illustrating a per-user TCP throughput as function of the preemption probability, according to an embodiment of the present invention.

The results obtained from those calculations may be verified for accuracy. For example, FIG. 21 illustrates a per-user TCP throughput as function of the preemption probability.

Figure 22:
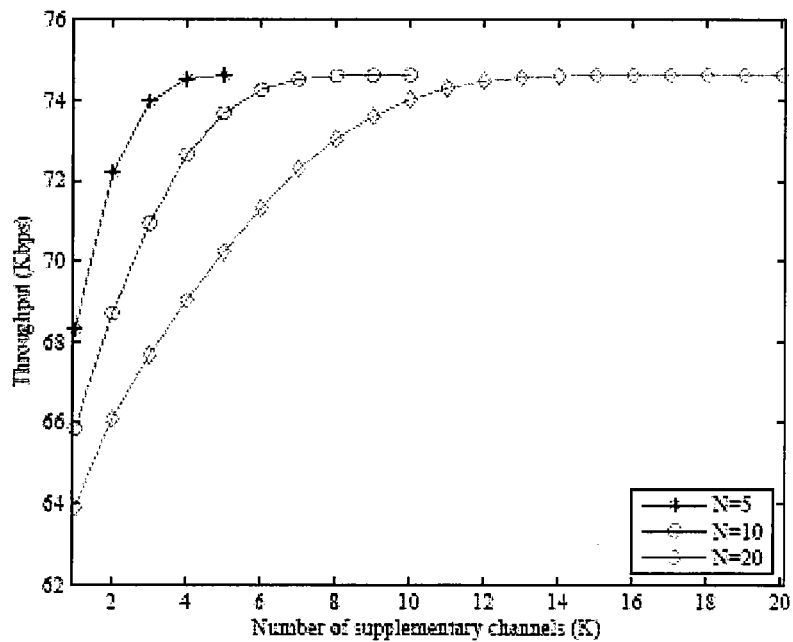
FIG. 22 is a graph illustrating TCP throughput as a function of K supplemental channels, according to an embodiment of the present invention.
Figure 23:
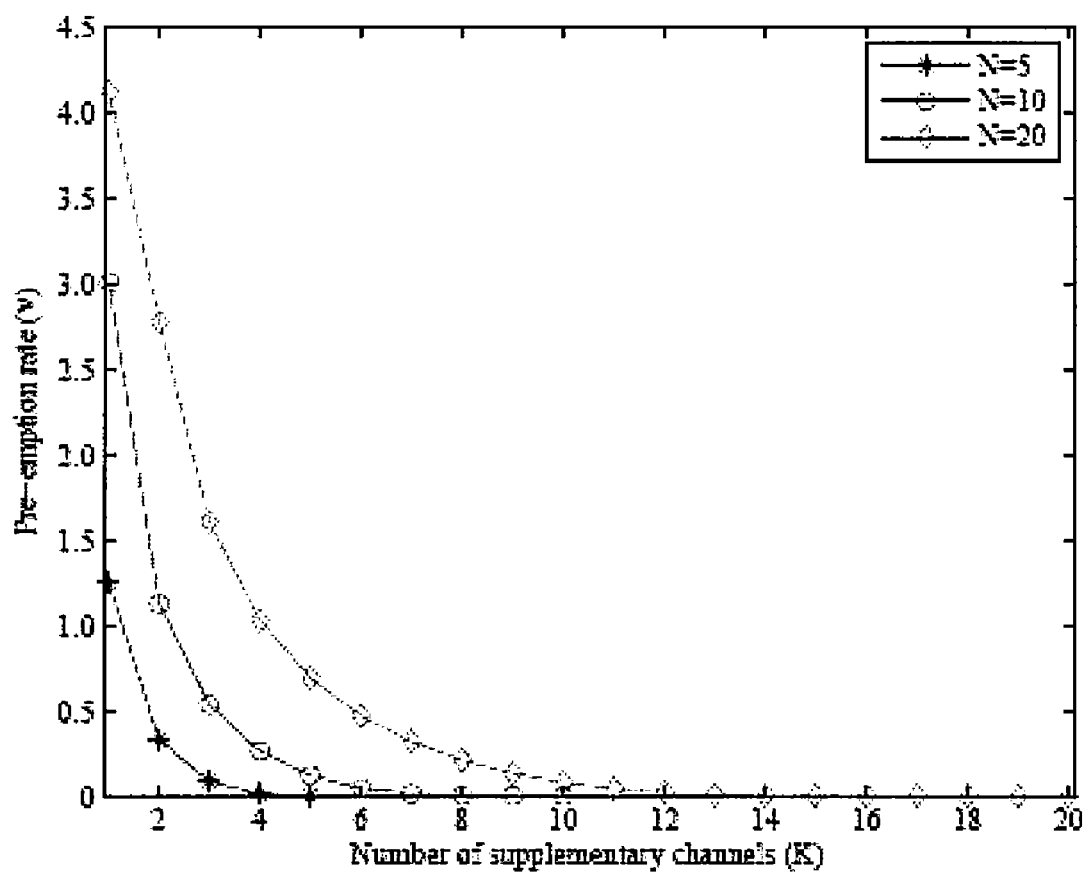
FIG. 23 is a graph illustrating preemption rate v as a function of K supplemental channels, according to an embodiment of the present invention.

The impact of the number of supplementary channels may be shown as illustrated in FIGS. 22-23. FIG. 22 illustrates TCP throughput as a function of K supplemental channels. FIG. 23 illustrates preemption rate v as a function of K supplemental channels.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method to allocate wireless channels to TCP sessions in a multi-rate wireless system, the method comprising:
    assigning a fundamental channel to each of a set of TCP sessions associated with mobile sessions wherein a TCP transmission rate is less than or equal to a fundamental transmission rate;
    when the TCP transmission rate reaches the fundamental channel rate for a TCP session, requesting a supplementary channel for the TCP session wherein the supplementary channel has a supplementary channel rate equal to or greater than the fundamental channel rate;
    if the supplementary channel is available, assigning the supplementary channel to the TCP session in place of the fundamental channel; and
    if the supplementary channel is not available, preempting an active TCP session that is already connected to the supplementary channel based on a preemption probability;
    removing the supplementary channel from the TCP session when the TCP transmission rate is less than the supplemental channel rate; and
    using the preemption probability to transition between states defined by the fundamental channel rate, the supplemental rate, and a packet error probability.

2. The media of claim 1, further comprising connecting the supplementary channel to the TCP session after the active TCP session has been preempted.

3. The media of claim 2, wherein removing the supplementary channel comprises re-assigning the fundamental channel to the TCP session.

4. The media of claim 3, wherein the preemption probability is computed based on TCP dynamics.

5. The media of claim 4, wherein allocating wireless channels includes assigning at least one of a fundamental and a supplemental channel to the mobile session.

6. A method for allocating wireless channels to TCP sessions in a multi-rate wireless system, the method comprising:

assigning a fundamental channel to each of a set of TCP sessions associated with mobile sessions wherein a TCP transmission rate is less than or equal to a fundamental transmission rate;

when the TCP transmission rate reaches the fundamental channel rate for a TCP session, requesting a supplementary channel for the TCP session wherein the supplementary channel has a supplementary channel rate equal to or greater than the fundamental channel rate;

if the supplementary channel is available, assigning the supplementary channel to the TCP session in place of the fundamental channel;

if the supplementary channel is not available, preempting an active TCP session that is already connected to the supplementary channel based on a preemptive probability;

removing the supplementary channel from the TCP session when the TCP transmission rate is less than the supplemental channel rate; and using the preemption probability to transition between states defined by the fundamental channel rate, the supplemental rate, and a packet error probability.

7. The method of claim 6, further comprising connecting the supplementary channel to the TCP session after the active TCP session has been preempted.

8. The method of claim 7, wherein removing the supplementary channel comprises re-assigning the fundamental channel to the TCP session.

9. The method of claim 8, wherein the preemption probability is computed based on TCP dynamics.

10. The method of claim 9, wherein allocating wireless channels includes assigning at least one of a fundamental and a supplementary channel to the mobile session.

11. A wireless system for adaptive scheduling of channel resources, the system comprising:

one or more mobile devices operating in a wireless network that respectively generate one or more TCP sessions;

a base station communicatively connected to said one or more mobile devices and the wireless network; and a wireless channel scheduler that generates messages that inform the base station of one or more fundamental channel rates to apply respectively to the one or more TCP sessions, that inform the base station of one or more supplementary channel rates to apply respectively to the one or more TCP sessions when one or more requests are made for a high rate channel, that inform the base station to preempt the one or more TCP sessions that are respectively connected to the one or more supplementary channels with a preemption probability, or that inform the base station to remove the one or more supplementary channels respectively from the one or more TCP sessions when a TCP transmission rate is less than a supplemental channel rate wherein the wireless scheduler is configured to use the preemption probability to transition between states defined by the fundamental channel rate, the supplemental channel rate, and a packet error probability.

* * * * *